(12) United States Patent
Kang et al.

(10) Patent No.: US 12,333,138 B2
(45) Date of Patent: Jun. 17, 2025

(54) COMPUTING SYSTEM WITH DISTRIBUTED COMPUTE-ENABLED STORAGE GROUP AND METHOD OF OPERATION THEREOF

(71) Applicant: Samsung Electronics Co., Ltd., Suwon-si (KR)

(72) Inventors: Yangwook Kang, San Jose, CA (US); Yang Seok Ki, Palo Alto, CA (US); Dongchul Park, San Jose, CA (US)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 357 days.

(21) Appl. No.: 17/955,310

(22) Filed: Sep. 28, 2022

(65) Prior Publication Data

US 2023/0028569 A1    Jan. 26, 2023

Related U.S. Application Data

(63) Continuation of application No. 14/817,815, filed on Aug. 4, 2015, now abandoned.
(Continued)

(51) Int. Cl.
*G06F 15/16*    (2006.01)
*G06F 3/06*    (2006.01)
(Continued)

(52) U.S. Cl.
CPC ............ *G06F 3/06* (2013.01); *G06F 3/061* (2013.01); *G06F 3/0614* (2013.01); *G06F 3/065* (2013.01);
(Continued)

(58) Field of Classification Search
CPC .......... G06F 3/06; G06F 3/061; G06F 3/0614; G06F 3/065; G06F 3/067; G06F 11/00; G06F 11/1076; H04L 67/1097
(Continued)

(56) References Cited

U.S. PATENT DOCUMENTS 6,145,017 A * 11/2000 Ghaffari ............... G06F 9/3879
710/33
6,484,235 B1    11/2002 Horst et al.
(Continued)

FOREIGN PATENT DOCUMENTS

| CN | 106415483 A | * | 2/2017 | ............... G06F 5/00 |
| JP | 2006235960 A | | 9/2006 | |
| WO | 2012020544 A1 | | 2/2012 | |

OTHER PUBLICATIONS

Marks, Howard, "Understanding VMware VAAI Offloads and Unloads," Mar. 26, 2014, https://www.networkcomputi ng.com/storage/understanding-vmware-vaai-offloads-and-u n loads/1578770159, Copyright © 2017 UBM, All rights reserved.
(Continued)

*Primary Examiner* — Moustafa M Meky
(74) *Attorney, Agent, or Firm* — Perspectives Law Group, Corp.

(57) ABSTRACT

A computing system includes: a storage device, coupled to central processing unit, includes: an in-storage processing engine configured to receive and manage application data from an application executed in a host computer, an in-storage processing coordinator, in the in-storage processing engine, configured to perform in-storage processing with formatted data, based on the application data, includes performing integer math operations, floating point math operations, Boolean operations, reorganization of data bits or symbols, and combinations thereof on the application data, and a data preprocessor, in the in-storage processing coordinator, configured to align the formatted data from the application data to return an in-storage processing output to the application for continued execution.

19 Claims, 15 Drawing Sheets

Related U.S. Application Data

(60) Provisional application No. 62/098,530, filed on Dec. 31, 2014.

(51) Int. Cl.
 *G06F 11/00* (2006.01)
 *H04L 67/1097* (2022.01)

(52) U.S. Cl.
 CPC .............. *G06F 3/067* (2013.01); *G06F 11/00* (2013.01); *H04L 67/1097* (2013.01)

(58) Field of Classification Search
 USPC ........................................................ 709/205
 See application file for complete search history.

(56) References Cited

U.S. PATENT DOCUMENTS

| | | | |
|---|---|---|---|
| 6,711,606 B1 | 3/2004 | Leymann et al. | |
| 6,804,676 B1 | 10/2004 | Bains, II | |
| 7,047,359 B1 | 5/2006 | Van Krevelen et al. | |
| 7,283,965 B1* | 10/2007 | Michener | H04H 20/89 |
| | | | 704/500 |
| 7,636,801 B1 | 12/2009 | Kekre et al. | |
| 8,116,741 B2* | 2/2012 | Helferich | H04W 68/00 |
| 8,205,015 B2* | 6/2012 | Flynn | G06F 3/0679 |
| | | | 710/36 |
| 8,335,859 B2* | 12/2012 | Nagpal | G06F 9/5094 |
| | | | 709/239 |
| 8,706,755 B2* | 4/2014 | Patel | G06F 16/10 |
| | | | 707/775 |
| 8,793,463 B2* | 7/2014 | Moss | G06F 12/0646 |
| | | | 711/170 |
| 8,892,677 B1* | 11/2014 | Grove | G06F 16/21 |
| | | | 709/219 |
| 9,047,208 B1* | 6/2015 | Moore | G06F 9/45533 |
| 9,270,944 B2* | 2/2016 | Brooks | H04N 21/2385 |
| 10,757,000 B2* | 8/2020 | Gelvin | H01Q 9/0464 |
| 10,791,442 B2* | 9/2020 | Wesby | H04L 41/08 |
| 10,991,459 B2* | 4/2021 | Ellis | H04L 63/08 |
| 11,256,665 B2* | 2/2022 | Prahlad | G06F 16/119 |
| 11,573,597 B2* | 2/2023 | Reeves | G06F 3/0346 |
| 11,640,359 B2* | 5/2023 | Flynn | G06F 3/0688 |
| | | | 711/103 |
| 11,895,188 B2* | 2/2024 | Vermeulen | G06F 16/184 |
| 2004/0186826 A1 | 9/2004 | Choi et al. | |
| 2005/0010709 A1 | 1/2005 | Davies et al. | |
| 2005/0071546 A1 | 3/2005 | Delaney et al. | |
| 2005/0125625 A1 | 6/2005 | Kilian et al. | |
| 2007/0220604 A1 | 9/2007 | Long | |
| 2010/0185719 A1 | 7/2010 | Howard | |
| 2010/0318549 A1 | 12/2010 | Mayr et al. | |
| 2011/0041005 A1 | 2/2011 | Selinger | |
| 2011/0296440 A1 | 12/2011 | Aurich et al. | |
| 2012/0096329 A1* | 4/2012 | Taranta, II | G06F 11/1076 |
| | | | 714/763 |
| 2013/0019072 A1 | 1/2013 | Strasser et al. | |
| 2013/0121234 A1 | 8/2013 | Shrivastava | |
| 2014/0189060 A1* | 7/2014 | Westphal | H04L 67/289 |
| | | | 709/217 |
| 2015/0120991 A1 | 4/2015 | Lee et al. | |
| 2015/0154200 A1 | 6/2015 | Lightner et al. | |
| 2015/0288381 A1* | 10/2015 | Dickie | H03M 7/00 |
| | | | 708/203 |
| 2016/0004455 A1* | 1/2016 | Iwasa | G06F 3/0689 |
| | | | 711/112 |
| 2016/0337464 A1 | 11/2016 | Eriksson et al. | |
| 2020/0348906 A1* | 11/2020 | Barnes, Jr. | G06Q 20/20 |
| 2020/0351341 A1* | 11/2020 | Illowsky | G06F 9/5011 |
| 2021/0334206 A1* | 10/2021 | Colgrove | G06F 3/0638 |
| 2022/0232075 A1* | 7/2022 | Emerson | H04L 67/1097 |

OTHER PUBLICATIONS

Jaeyoung Do, Yang-Suk Kee, Jignesh M. Patel, Chanik Park, Kwanghyun Park, David J. Dewitt, Query Processing on Smart SSDs: Opportunities and Challenges, University of Wisconsin—Madison; Samsung Electronic Corp.; Microsoft Corp.; Jun. 22, 2013, http://pages.cs.wisc.edu/-jignesh/publ/SmartSSD.pdf (Year: 2013); 10 pages.

Paul Rubens, "Big Data and In-Storage Processing;" Feb. 18, 2013, http://www.enterprisestorageforum.com/storage-management/big-data-and-in-storage-processing.html (Year: 2013); Property of QuinStreet Enterprise; Copyright © 2018 QuinStreet Inc. All rights reserved; 3 pages.

ReclaiMe Free RAID Recovery, "What is RAID?;" 2009, http://www.freeraidrecovery.com/library/what-is-raid.aspx; Copyright © 2009-2017 www.ReclaiMe.com; 4 pages.

Intel Corporation and Seagate Technology Joint WhitePaper; "Serial ATA Native Command Queuing an Exciting New Performance Feature for Serial ATA;" Jul. 2003, https ://www.seagate.com/docs/pdf /whitepape r /D2c tech paper _i ntc-stx sata ncq. Pdf; pp. 1-12; Copyright © 2003, Intel Corporation and Seagate Technology LLC, All rights reserved.

* cited by examiner

COMPUTING SYSTEM WITH DISTRIBUTED COMPUTE-ENABLED STORAGE GROUP AND METHOD OF OPERATION THEREOF

CROSS-REFERENCE TO RELATED APPLICATION(S)

This application is a Continuation of co-pending U.S. patent application Ser. No. 14/817,815 filed Aug. 4, 2015, and the subject matter thereof is incorporated herein by reference thereto. U.S. patent application Ser. No. 14/817,815 filed Aug. 4, 2015 further claims the benefit of U.S. Provisional Patent Application Ser. No. 62/098,530 filed Dec. 31, 2014, and the subject matter thereof is incorporated herein by reference thereto.

TECHNICAL FIELD

Embodiments relate generally to a computing system, and more particularly to a system with distribute compute-enabled storage.

BACKGROUND

Modern consumer and industrial electronics, such as computing systems, servers, appliances, televisions, cellular phones, automobiles, satellites, and combination devices, are providing increasing levels of functionality to support modern life. These devices are more interconnected. Storage of information is becoming more of a necessity.

Research and development in the existing technologies can take a myriad of different directions. Storing information locally or over a distributed network is becoming more important. Processing efficiency and inputs/outputs between storage and computing resources are more problematic as the amount of data, computation, and storage increases.

Thus, a need still remains for a computing system with distributed compute-enabled storage group for ubiquity of storing and retrieving information regardless of the source of data or the request for the data, respectively. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment provides an apparatus, including: a storage device, coupled to central processing unit, includes: an in-storage processing engine configured to receive and manage application data from an application executed in a host computer, an in-storage processing coordinator, in the in-storage processing engine, configured to perform in-storage processing with formatted data, based on the application data, includes performing integer math operations, floating point math operations, Boolean operations, reorganization of data bits or symbols, and combinations thereof on the application data, and a data preprocessor, in the in-storage processing coordinator, configured to align the formatted data from the application data to return an in-storage processing output to the application for continued execution.

An embodiment provides a method including: receiving and managing application data from an application, executed by a host computer, by an in-storage processing engine; performing in-storage processing with formatted data, based on the application data, including performing integer math operations, floating point math operations, Boolean operations, reorganization of data bits or symbols, and combinations thereof on the application data by an in-storage processing coordinator; and aligning the formatted data from the application data to return an in-storage processing output to the application, by a data preprocessor, for continued execution.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
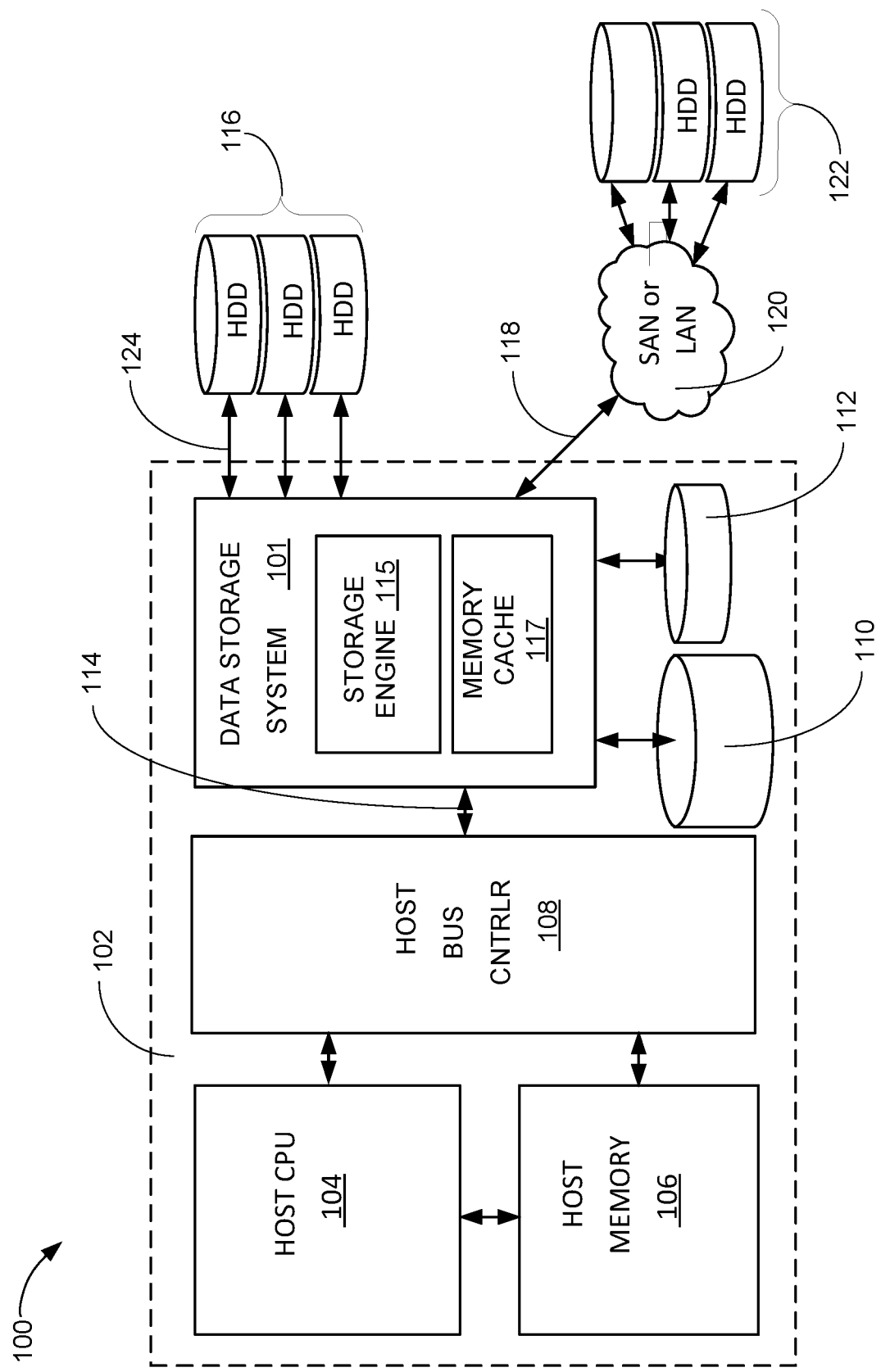
FIG. 1 is a computing system with distributed compute-enabled storage group in an embodiment of the present invention.

Various embodiments provide a computing system for efficient distributed processing by providing methods and apparatus for performing in-storage processing with multiple storage devices with capabilities for performing in-storage processing of the application data. An execution of an application can be shared by distributing the execution among various storage devices in a storage device. Each of the storage devices can perform in-storage processing with the application data as requested by an application request.

Various embodiments provide a computing system to reduce overall system power consumption by reducing the number of inputs/outputs between the application execution and the storage device. This reduction is achieved by having the storage devices perform in-storage processing instead of mere storage, read, and re-store by the application. Instead, the in-storage processing outputs can be returned as an aggregated output from the various storage devices that performed the in-storage processing, back to the application. The application can continue to execute and utilize the in-storage outputs, the aggregated output, or a combination thereof.

Various embodiments provide a computing system that reduces total cost of ownership by providing formatting and translation functions for the application data for different configurations or organizations of the storage device. Further, the computing system also provides translation for the in-storage processing to be carried out by the various storage devices as part of the storage group. Examples of types of translation or formatting include split, split+padding, split+redundancy, and mirroring.

Various embodiments provide a computing system that also minimizes integration by allowing the storage devices to handle more of the in-storage processing coordination functions, with less being done by the host execution the application. Another embodiment allows for the in-storage processing coordination to increasingly be located and operate outside of both the host and the storage devices.

Various embodiments provide a computing system with more efficient execution of the application with less interrupts to the application by coordinating the outputs of the in-storage processing from the storage devices. The output coordination can buffer the in-storage processing outputs and can also sort the order of each of the in-storage processing outputs before returning an aggregated output to the application. The application can continue to execute and utilize the in-storage outputs, the aggregated output, or a combination thereof.

Various embodiments provide a computing system further minimizing integration obstacles by allowing the storage devices in the storage group to have different or the same functionalities. As an example, one of the storage devices can function as the only output coordinator for all the in-storage processing outputs from the other storage devices. As a further example, the aggregation function can be distributed amongst the storage devices, passing along from storage device to storage device and performing partial aggregation at each storage device, until a final one of the storage devices returns the full aggregated output back to the application. The application can continue to execute and utilize the in-storage outputs, the aggregated output, or a combination thereof.

The following embodiments are described in sufficient detail to enable those skilled in the art to make and use the invention. It is to be understood that other embodiments may be evident based on the present disclosure, and that system, process, architectural, or mechanical changes can be made to the embodiments as examples without departing from the scope of the present invention.

In the following description, numerous specific details are given to provide a thorough understanding of the invention. However, it will be apparent that the invention and various embodiments may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, an embodiment can be operated in any orientation.

The term "module" referred to herein can include software, hardware, or a combination thereof in an embodiment of the present invention in accordance with the context in which the term is used. For example, the software can be machine code, firmware, embedded code, application software, or a combination thereof. Also for example, the hardware can be circuitry, processor, computer, integrated circuit, integrated circuit cores, a pressure sensor, an inertial sensor, a microelectromechanical system (MEMS), passive devices, or a combination thereof. Additional examples of hardware circuitry can be digital circuits or logic, analog circuits, mixed-mode circuits, optical circuits, or a combination thereof. Further, if a module is written in the apparatus claims section below, the modules are deemed to include hardware circuitry for the purposes and the scope of apparatus claims.

The modules in the following description of the embodiments can be coupled to one another as described or as shown. The coupling can be direct or indirect without or with, respectively, intervening between coupled items. The coupling can be physical contact or by communication between items.

Referring now to FIG. 1, therein is shown a computing system 100 with a data protection mechanism in an embodiment of the present invention. The computing system 100 is depicted in FIG. 1 as a functional block diagram of the computing system 100 with a data storage system 101. The functional block diagram depicts the data storage system 101 installed in a host computer 102.

Various embodiments can include the computing system 100 with devices for storage, such as a solid state disk 110, a non-volatile memory 112, hard disk drives 116, memory devices 117, and network attached storage 122. These devices for storage can include capabilities to perform in-storage processing, that is, to independently perform relatively complex computations at a location outside of a traditional system CPU. As part of the in-storage processing paradigm, various embodiments of the present inventive concept manage the distribution of data, the location of data, and the location of processing tasks for in-storage processing. Further, these in-storage computing enabled storage devices can be grouped or clustered into arrays. Various embodiments manage the allocation of data and/or processing based on the architecture and capabilities of these devices or arrays. In-storage processing is further explained later.

As an example, the host computer 102 can be as a server or workstation. The host computer 102 can include at least a central processing unit 104, host memory 106 coupled to the central processing unit 104, and a host bus controller 108. The host bus controller 108 provides a host interface bus 114, which allows the host computer 102 to utilize the data storage system 101.

It is understood that the function of the host bus controller 108 can be provided by central processing unit 104 in some implementations. The central processing unit 104 can be implemented with hardware circuitry in a number of different manners. For example, the central processing unit 104 can be a processor, an application specific integrated circuit (ASIC) an embedded processor, a microprocessor, a hardware control logic, a hardware finite state machine (FSM), a digital signal processor (DSP), a field programmable gate array (FPGA), or a combination thereof.

The data storage system 101 can be coupled to a solid state disk 110, such as a non-volatile memory based storage group having a peripheral interface system, or a non-volatile memory 112, such as an internal memory card for expanded or extended non-volatile system memory.

The data storage system 101 can also be coupled to hard disk drives (HDD) 116 that can be mounted in the host computer 102, external to the host computer 102, or a combination thereof. The solid state disk 110, the non-volatile memory 112, and the hard disk drives 116 can be considered as direct attached storage (DAS) devices, as an example.

The data storage system 101 can also support a network attach port 118 for coupling to a network 120. Examples of the network 120 can include a personal area network (PAN), a local area network (LAN), a storage area network (SAN), a wide area network (WAN), or a combination thereof. The network attach port 118 can provide access to network attached storage (NAS) 122. The network attach port 118 can also provide connection to and from the host bus controller 108.

While the network attached storage 122 are shown as hard disk drives, this is an example only. It is understood that the network attached storage 122 could include any non-volatile storage technology, such as magnetic tape storage (not shown), storage devices similar to the solid state disk 110, non-volatile memory 112, or hard disk drives 116 that are accessed through the network attach port 118. Also, the network attached storage 122 can include aggregated resources, such as just a bunch of disks (JBOD) systems or redundant array of intelligent disks (RAID) systems as well as other network attached storage 122.

The data storage system 101 can be attached to the host interface bus 114 for providing access to and interfacing to multiple of the direct attached storage (DAS) devices via a cable 124 for storage interface, such as Serial Advanced Technology Attachment (SATA), the Serial Attached SCSI (SAS), or the Peripheral Component Interconnect-Express (PCI-e) attached storage devices.

The data storage system 101 can include a storage engine 115 and memory cache 117. The storage engine 115 can be implemented with hardware circuitry, software, or a combination thereof in a number of ways. For example, the storage engine 115 can be implemented as a processor, an application specific integrated circuit (ASIC), an embedded processor, a microprocessor, a hardware control logic, a hardware finite state machine (FSM), a digital signal processor (DSP), FPGA, or a combination thereof.

The central processing unit 104 or the storage engine 115 can control the flow and management of data to and from the host computer 102, and from and to the direct attached storage (DAS) devices, the network attached storage 122, or a combination thereof. The storage engine 115 can also perform data reliability check and correction, which will be further discussed later. The storage engine 115 can also control and manage the flow of data between the direct attached storage (DAS) devices and the network attached storage 122 and amongst themselves. The storage engine 115 can be implemented in hardware circuitry, a processor running software, or a combination thereof.

For illustrative purposes, the storage engine 115 is shown as part of the data storage system 101, although the storage engine 115 can be implemented and partitioned differently. For example, the storage engine 115 can be implemented as part of in the host computer 102, implemented in software, implemented in hardware, or a combination thereof. The storage engine 115 can be external to the data storage system 101. As examples, the storage engine 115 can be part of the direct attached storage (DAS) devices described above, the network attached storage 122, or a combination thereof. The functionalities of the storage engine 115 can be distributed as part of the host computer 102, the direct attached storage (DAS) devices, the network attached storage 122, or a combination thereof. The central processing unit 104 or some portion of it can also be in the data storage system 101, the direct attached storage (DAS) devices, the network attached storage 122, or a combination thereof.

The memory devices 117 can function as a local cache to the data storage system 101, the computing system 100, or a combination thereof. The memory devices 117 can be a volatile memory or a nonvolatile memory. Examples of the volatile memory can include static random access memory (SRAM) or dynamic random access memory (DRAM).

The storage engine 115 and the memory devices 117 enable the data storage system 101 to meet the performance requirements of data provided by the host computer 102 and store that data in the solid state disk 110, the non-volatile memory 112, the hard disk drives 116, or the network attached storage 122.

For illustrative purposes, the data storage system 101 is shown as part of the host computer 102, although the data storage system 101 can be implemented and partitioned differently. For example, the data storage system 101 can be implemented as a plug-in card in the host computer 102, as part of a chip or chipset in the host computer 102, as partially implement in software and partially implemented in hardware in the host computer 102, or a combination thereof. The data storage system 101 can be external to the host computer 102. As examples, the data storage system 101 can be part of the direct attached storage (DAS) devices described above, the network attached storage 122, or a combination thereof. The data storage system 101 can be distributed as part of the host computer 102, the direct attached storage (DAS) devices, the network attached storage 122, or a combination thereof.

Figure 2:
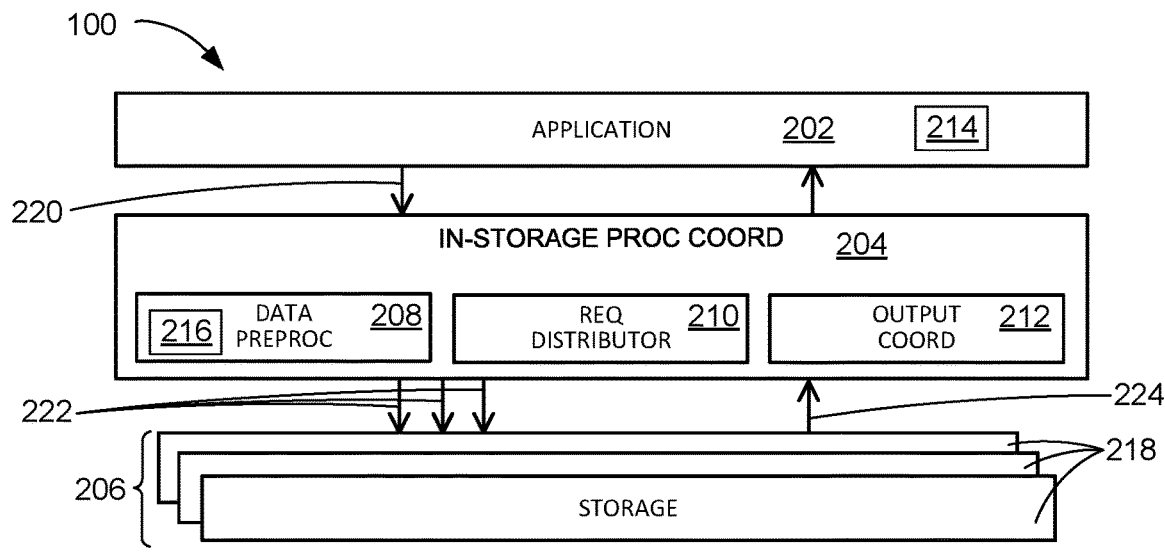
FIG. 2 is an example of an architectural view of a computing system with a distributed compute-enabled storage device.

Referring now to FIG. 2, therein is shown an architectural view of a computing system 100 with a distributed compute-enabled storage device. The architectural view can depict an example of relationships between some parts in the computing system 100. As an example, the architectural view can depict the computing system 100 to include an application 202, an in-storage processing coordinator 204, and a storage group 206.

As an example, the storage group 206 can be partitioned in the computing system 100 of FIG. 1 in a number of ways. For example, the storage group 206 can be part of or distributed among the data storage system 101 of FIG. 1, the hard disk drives 116 of FIG. 1, the network attached storage 122 of FIG. 1, the solid state disk 110 of FIG. 1, the non-volatile memory 112 of FIG. 1, or a combination thereof.

The application 202 is a process executing a function. The application 202 can provide an end-user (not shown) function or other functions related to the operation, control, usage, or communication of the computing system 100. As an example, the application 202 can be a software application executed by a processor, a central processing unit (CPU), a programmable hardware state machine, or other hardware circuitry that can execute software code from the software application. As a further example, the application 202 can be a function executed purely in hardware circuitry, such as logic gates, finite state machine (FSM), transistors, or a combination thereof. The application 202 can execute on the central processing unit 104 of FIG. 1.

The in-storage processing coordinator 204 manages the communication and activities between the application 202 and the storage group 206. The in-storage processing coordinator 204 can manage the operations between the application 202 and the storage group 206. As an example, the in-storage processing coordinator 204 can translate information between the application 202 and the storage group 206. Also for example, the in-storage processing coordinator 204 can—direct information flow and assignments between the application 202 and the storage group 206. As an example, the in-storage processing coordinator 204 can include a data preprocessor 208, a request distributor 210, and an output coordinator 212.

As an example, the in-storage processing coordinator 204 or portions of it can be executed by the central processing unit 104 or other parts of the host computer 102. The in-storage processing coordinator 204 or portions of it can also be executed by the data storage system 101. As a specific example, the storage engine 115 of FIG. 1 can execute the in-storage processing coordinator 204 or portions of it. The hard disk drives 116 of FIG. 1, the network attached storage 122 of FIG. 1, the solid state disk 110 of FIG. 1, the non-volatile memory 112 of FIG. 1, or a combination thereof can execute the in-storage processing coordinator 204 or portions of it.

The data preprocessor 208 performs data formatting of application data 214 and placement of formatted data 216. The application data 214 is the information or data generated by the application 202. The formatting can enable storing the application data 214 as formatted data 216 across multiple storage devices 218 for in-storage processing (ISP) to be stored in the storage group 206.

In-storage processing refers to the processing or manipulation of the formatted data 216 to be sent back to the application 202 or the system executing the application 202. The in-storage processing is more than mere storing and retrieval of the formatted data 216. Examples of the manipulation or processing as part of the in-storage processing can include integer or floating point math operations, Boolean operations, reorganization of data bits or symbols, or a combination thereof. Other examples of manipulating or processing as part of the in-storage processing can include search, sort, compares, filtering, combining the formatted data 216, the application data 214, or a combination thereof.

As a further example, the data preprocessor 208 can format the application data 214 from the application 202 and generate the formatted data 216 to be processed outside or independent from execution of the application 202. This independent processing can be performed with the in-storage processing. The application data 214 can be independent of and not necessarily the same format as those stored in the storage group 206. The format of the application data 214 can be different than the formatted data 216, which will be described later.

Depending on the type of the application data 214, array configurations of the storage group 206, or other user-defined policies, the application data 214 can be processed in various ways. As an example, the policies can refer to availability requirements so as to affect the array configuration, such as mirroring, of the storage group 206. As a further example, the policies can refer to performance requirements as to further affect the array configuration, such as striping, of the storage group 206.

As examples of translation, the application data 214 can be translated to the formatted data 216 using various methods, such as split, split+padding, split+redundancy, and mirroring. These methods can create independent data sets of the formatted data 216 that can be distributed to multiple storage devices 218, allowing for concurrent in-storage processing. The concurrent in-storage processing refers to each of the storage devices 218 in the storage group 206 being able to independently process or operate on the formatted data 216, the application data 214, or a combination thereof. This independent processing or operation can be independent of the execution of the application 202, the other storage devices 218 of the storage group 206 that received some of the formatted data 216 from the application data 214, or a combination thereof.

The request distributor 210 manages application requests 220 between the application 202 and the storage group 206. As a specific example, the request distributor 210 accepts the application requests 220 from the application 202 and distributes them. The application requests 220 are actions between the application 202 and the storage group 206 based on the in-storage processing. For example, the application requests 220 can provide information from the application 202 to be off-loaded to the storage group 206 for in-storage processing. Furthering the example, the results of the in-storage processing can be returned to the application 202 based on the application requests 220.

As an example, the request distributor 210 manages the application requests 220 from the application 202 for in-storage processing, for write or storage, or for output. The request distributor 210 also distributes the application requests 220 from the application 202 across the multiple storage devices 218 in the storage group 206.

As another example, incoming application requests 220 for in-storage processing can be split into multiple sub-application requests 222 to perform in-storage processing according to a distribution of the formatted data 216, organization of the storage group 206, or other policies. The request distributor 210 can perform this split of the application request 220 for in-storage processing based on the placement scheme for the application data 214, the formatted data 216, or a combination thereof.

Figure 9:
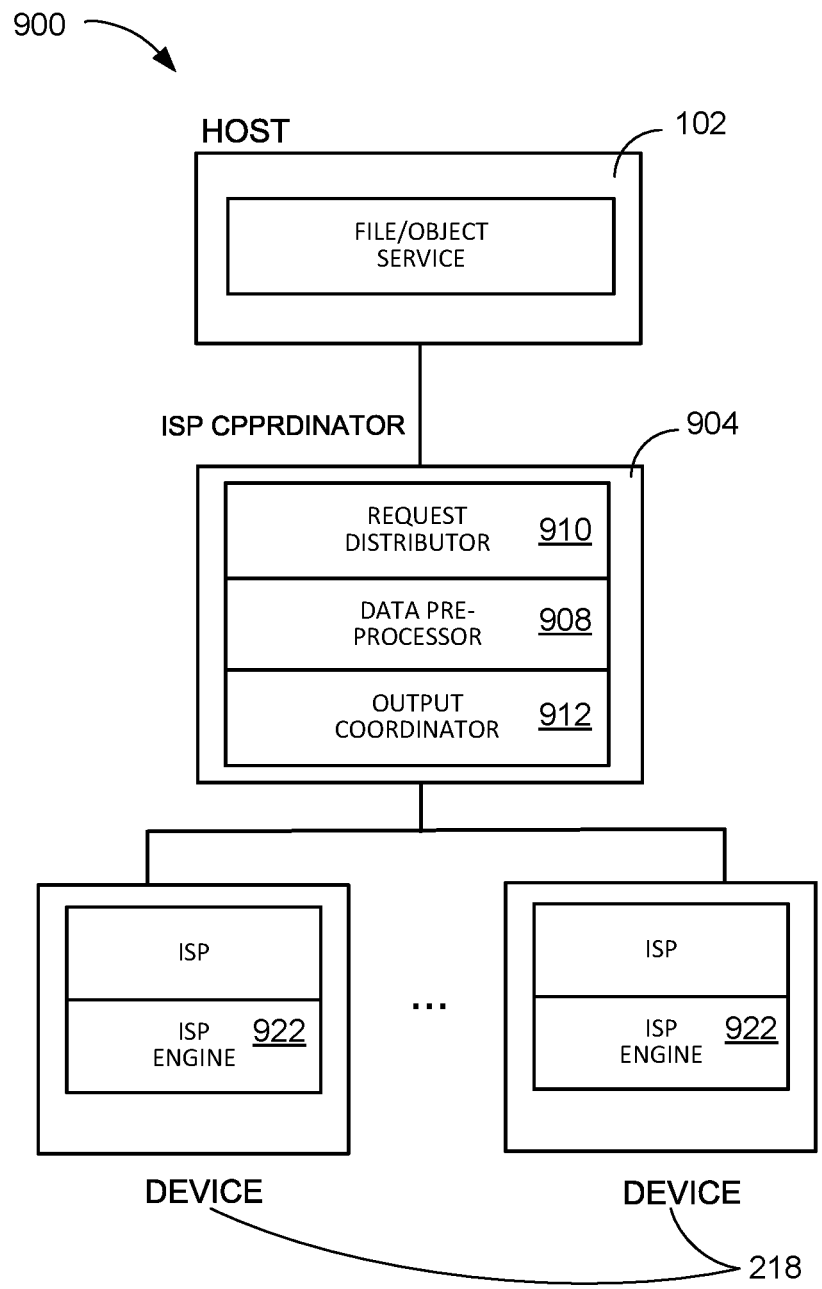
FIG. 9 is an example of an architectural view of the computing system in an embodiment.
Figure 10:
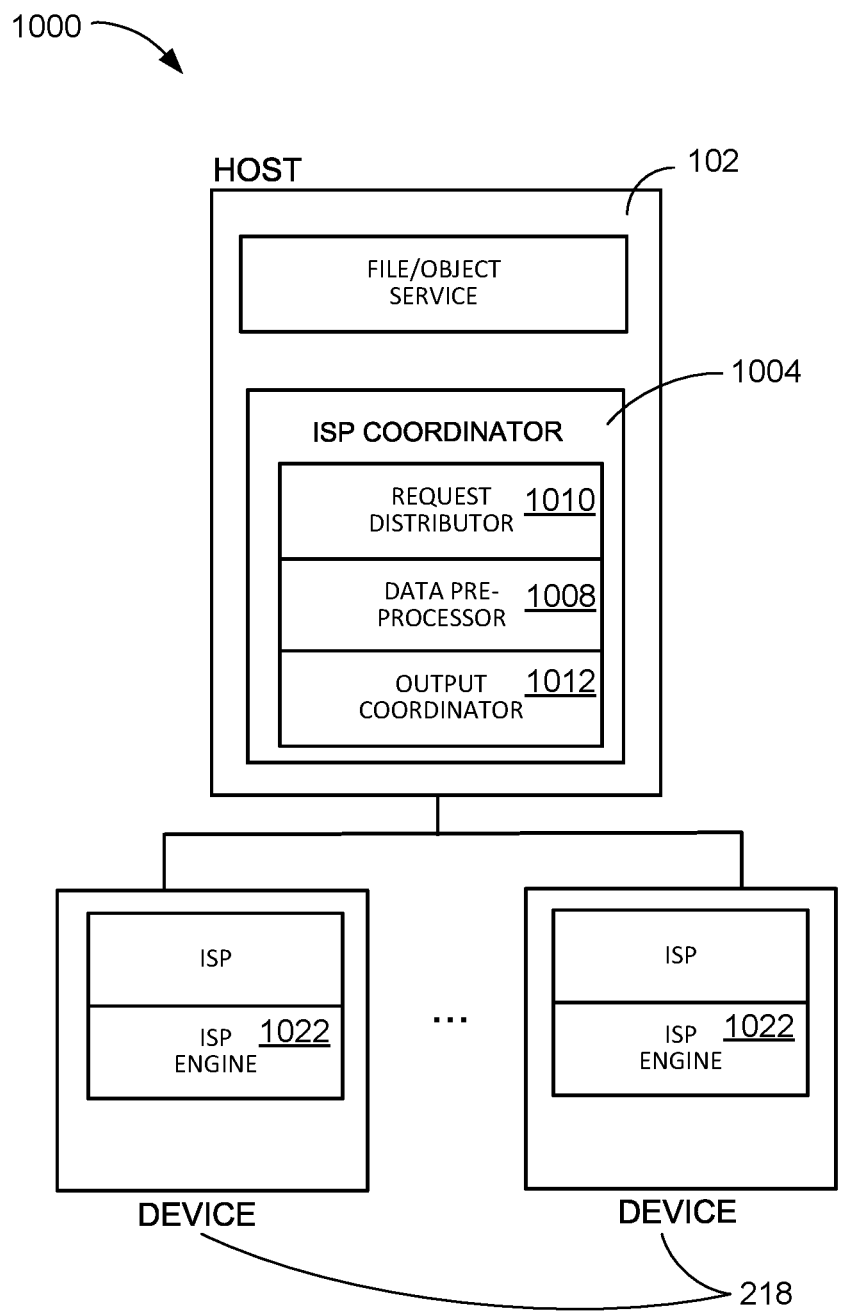
FIG. 10 is an example of an architectural view of the computing system in a further embodiment.
Figure 11:
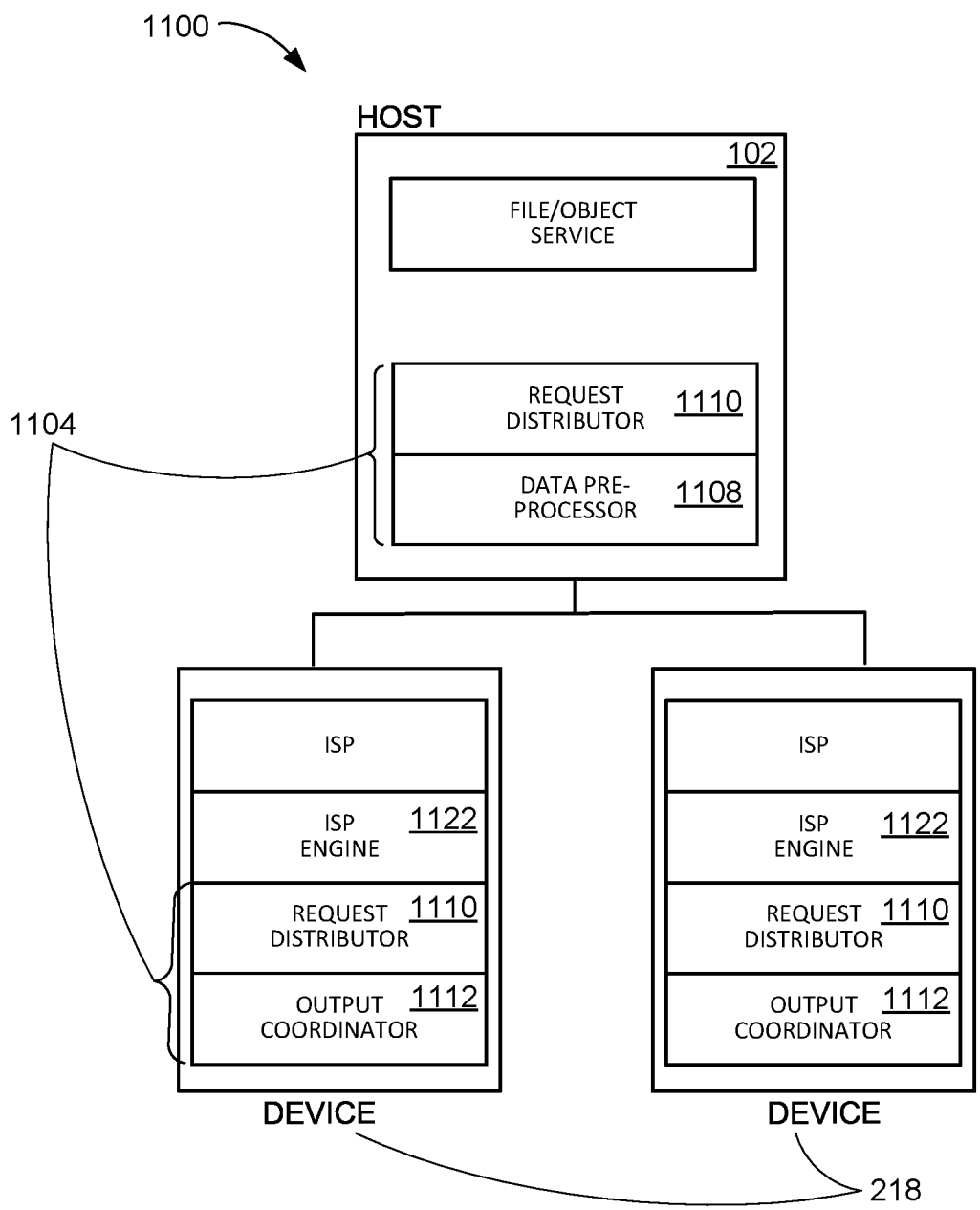
FIG. 11 is an example of an architectural view of the computing system in a yet further embodiment.

Example types of data placement schemes include a centralized scheme and decentralized scheme, discussed from FIGS. 9 to 11. In various embodiments in a centralized scheme, the data preprocessor 208 is placed inside the in-storage processing coordinator 204, while a decentralized model places the data preprocessor 208 inside the storage group 206.

For the embodiments with a centralized scheme, once the in-storage processing coordinator 204 receives an application request 220 such as a data write request with required information, as an example, address, data, data length, and a logical boundary, from the application 202, the request distributor 210 provides the data preprocessor 208 with the required information such as data, data length, and logical boundary. Then, the data preprocessor 208 partitions the data into multiple data chunks of an appropriate size based on the store unit information. Then, the request distributor 210 distributes the corresponding data chunks to each of the storage devices 218 with multiple sub-application requests 222. The storage group 206, the storage devices 218, or a combination thereof can receive the application requests 220, the sub-application requests 222, or a combination thereof. On the other hand, the request distributor 210 in a decentralized model divides the data into a predefined size of chunks, for instance, data size/N, where N is the number of storage devices, and then distributes the chunks of data into each of the storage devices 218 with sub-application requests 222 combined with the required information such as address, data length, and a logical boundary. Then, the data preprocessor 208 inside storage devices 206 partitions the assigned data into smaller chunks based on the store unit information.

As a further specific example, for a write request for the application data 214, given the application data 214 to be written, its length, and an optional logical boundary of the application data 214, the request distributor 210 can send the write request to the data preprocessor 208 so that it can determine how to distribute the application data 214. Once data distribution is determined, the request distributor 210 can issue the write request to the storage devices 218 in the storage group 206. The host bus controller 108 of FIG. 8 or the network attach port 118 of FIG. 1 can be used to execute the request distributor 210 and issue the application requests 220.

Continuing with the example, the storage devices 218 can perform the in-storage processing on the formatted data 216. The request distributor 210 can process the request for output by forwarding the output request to the in-storage processing coordinator 204, or as a specific example to the output coordinator 212, to send in-storage processing outputs 224 back to the application 202 or the system executing the application 202. The application can continue to execute with the in-storage processing outputs 224. The in-storage processing outputs 224 can be the results of the in-storage processing by the storage group 206 of the formatted data 216. The in-storage processing outputs 224 are not a mere read-back or read of the formatted data 216 stored in the storage group 206.

The output coordinator 212 can manage processed data generated from each of the multiple storage devices 218 of the storage group 206 and can send it back to the application 202. As an example, the output coordinator 212 collects the results or the in-storage processing outputs 224 and provides them to the application 202 or various applications 202 or the system executing the application 202. The output coordinator 212 will be described later.

The computing system 100 also can provide error handling capabilities. For example, when one or more of the storage devices 218 in the storage group 206 become inaccessible or has a slower performance, the application requests 220 can fail, such as time-outs or non-completions. For better availability, the computing system 100 can perform a number of actions.

The following are examples for the application requests 220 for writes to the storage group 206. The in-storage processing coordinator 204, or as a more specific example the request distributor 210, can maintain a request log that can be used to issue retries for the application requests 220 that failed or were not completed. Also as an example, the in-storage processing coordinator 204 can keep retrying the application requests 220 to write the application data 214. As a further example, the in-storage processing coordinator 204 can report that status of the application requests 220 to the application 202.

The following are examples for the application requests 220 for in-storage processing at the storage group 206. If one of the storage devices 218 in the storage group 206 includes a replica of the application data 214, the formatted data 216, or a combination thereof as to the storage device 218 that was inaccessible, these application requests 220 can be redirected to the storage device 218 with the replica. If error recovery is possible, the error recovery process can be executed prior to the previous failed application requests 220 being reissued to the recovered storage device 218. An example of the error recovery technique can be a redundant array of inexpensive disk (RAID) recovery with rebuilding a storage device 218 that has been striped. As other examples, the in-storage processing coordinator 204 can try the application requests 220 that previously failed. The in-storage processing coordinator 204 can also generate reports of failures even if the application requests 220 are redirected, retried, and even eventually successful.

The in-storage processing coordinator 204 or at least a portion of it can be implemented in a number of ways. As an example, the in-storage processing coordinator 204 can be implemented with software, hardware circuitry, or a combination thereof. Examples of hardware circuitry can include a processor, an application specific integrated circuit (ASIC) an embedded processor, a microprocessor, a hardware control logic, a hardware finite state machine (FSM), a digital signal processor (DSP), FPGA, or a combination thereof.

Figure 3:
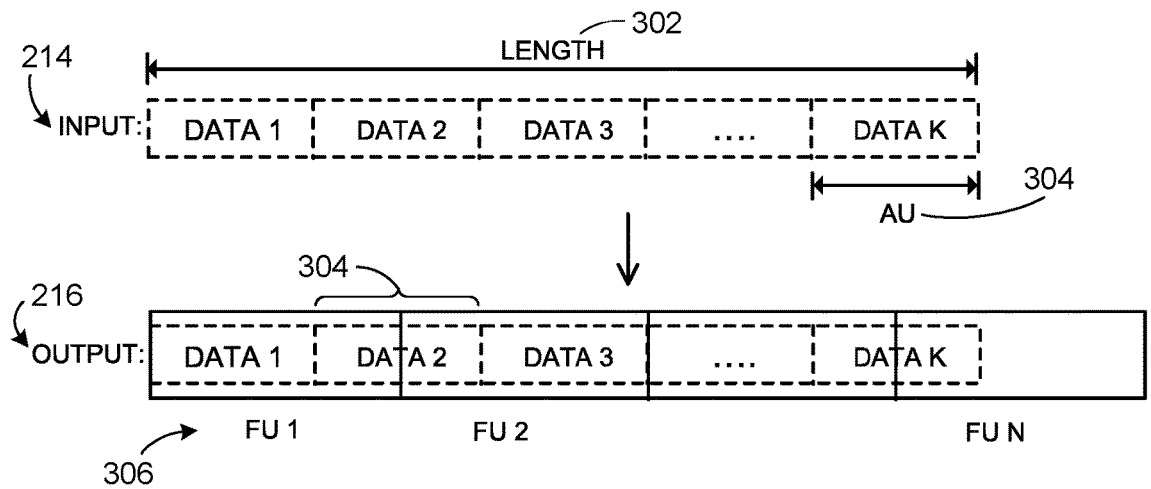
FIG. 3 is an example of an operational view for a split function of the data preprocessor.

Referring now to FIG. 3, there is shown an example of an operational view for a split function of the data preprocessor 208 of FIG. 2. FIG. 3 depicts that application data 214 as input to the data preprocessor 208 or more generally the in-storage processing coordinator 204 of FIG. 2. FIG. 3 depicts one example method of the data formatting performed by the data preprocessor 208 as mentioned in FIG. 2. In this example, the data formatting is a split function or a split scheme. FIG. 3 also depicts the formatted data 216 as the output of the data preprocessor 208.

In this example, the amount of the application data 214 is shown to span a transfer length 302. The transfer length 302 refers to the amount of data or information sent by the application 202 to the data preprocessor 208 or vice versa. The transfer length 302 can be a fixed size or variable depending on what the application 202 transfers for in-storage processing.

Also in this example, the application data 214 can include application units 304. The application units 304 are fields within or portions of the application data 214. Each of the application units 304 can be fixed in size or can be variable. As an example, the application units 304 can represent partitioned portion or chunks of application data 214.

As an example, the size of each of the application units 304 can be the same across the application data 214. Also as an example, the size of each of the application units 304 across the application data 214 can differ for different transfers of the application data 214. Further for example, the size of each of the application units 304 can vary within the same transfer or across transfers. The application units 304 can also vary in size depending on the different applications 202 sending the application data 214. The number of application units 304 can vary or can be fixed. The number of application units 304 can vary for the same application 202 sending the application data 214 or between different applications 202.

FIG. 3 also depicts the formatted data 216 as the output of the data preprocessor 208. The formatted data 216 can include formatted units 306 (FUs). The formatted units 306 are fields within that formatted data 216. In this example, each of the formatted units 306 can be fixed in size or can be variable. The size of the formatted units 306 can be the same for the formatted data 216 or different for transfers of the formatted data 216, or can vary within the same transfer or across transfers. The formatted units 306 can also vary in size depending on the different applications 202 sending the formatted data 216. The number of the formatted units 306 can vary or can be fixed. The number of the formatted units 306 can vary for the same application 202 sending the formatted data 216 or between different applications 202.

FIG. 3 depicts the formatted data 216 after a split formatting with the formatted units 306 overlaid visually with the application units 304. An example storage application for this split formatting or split scheme can be with redundant array of inexpensive disk (RAID) systems as the storage group 206, or with at least some of the multiple storage devices 218 in the storage group 206. The in-storage processing, or even the mere storage of the application data 214, can at least involve splitting the application units 304 to different destination devices in the storage group 206.

Continuing with this example, the data preprocessor 208 can split the application data 214 into a predefined fixed-length blocks referred to as the formatted units 306 and can give each block to one or more of the multiple storage devices 218 of the in-storage processing in a round robin fashion, as an example. The split scheme can generate non-aligned data sets between the application data 214 and the formatted data 216. As a specific example, the data preprocessor 208 can generate the non-alignment between the application units 304 relative to the boundaries for the formatted units 306.

Further with this example, FIG. 3 depicts an alternating formatting or allocation of the application units 304 to the different devices in the storage group 206. In this example, the application units 304 are depicted as "Data 1, "Data 2", "Data 3", and through "Data K". The formatted units 306 are depicted as "FU 1", "FU 2", and through "FU N".

As a specific example, the formatted data 216 can have alternating instances targeted for one device or another device in the storage group 206. In other words, for example, odd numbered "FUs" can be for drive 1 and even numbered "FUs" can be for drive 0. The overlay of the application units 304 as "Data" is shown as not aligned with the boundaries of the "FU" and FIG. 3 depicts "Data 2" and "Data K" being split between FU 1 (drive 1) and FU 2 (drive 0), again for this example.

As a further example, the formatted data 216 can also be stored on one of the storage device 218 as opposed to being partitioned or allocated to different instances of the storage devices 218 in the storage group 206. In this example, the formatted units 306 can be sized for a sector based on a physical block address or a logical block address on one of the storage devices 218 as a hard disk drive or a solid state disk drive.

As a specific example for the split function, the request distributor 210 can initially send up to N in-storage processing application requests 220 to the storage devices 218 in the storage group 206. The term N is an integer number. The application units 304 that are not aligned with the formatted units 306, such as "Data 2" and "Data K" in this figure and example, can undergo additional processing at the storage devices 218 with in-storage processing.

For example, the non-aligned application units 304 can be determined after initial processing of the application data 214 by the host computer 102 of FIG. 1, the request distributor 210, or other storage devices 218. The non-aligned application units 304 can by fetched by the host computer 102 or the request distributor 210 allowing the non-aligned application units 304 to be concurrently processed by the host computer 102, the request distributor 210, the storage devices 218 in the storage group 206, or a combination thereof. The non-aligned application units 304 can also be fetched by the host computer 102 or the request distributor 210 such that these non-aligned application units 304 can be written back to the devices for in-storage processing. Each of the storage devices 218 can send the results of the processed non-aligned application units 304 to the host computer 102, the request distributor 210, or the other storage devices 218 so the host computer 102 or the other storage devices 218 can continue to process the application data 214.

Figure 4:
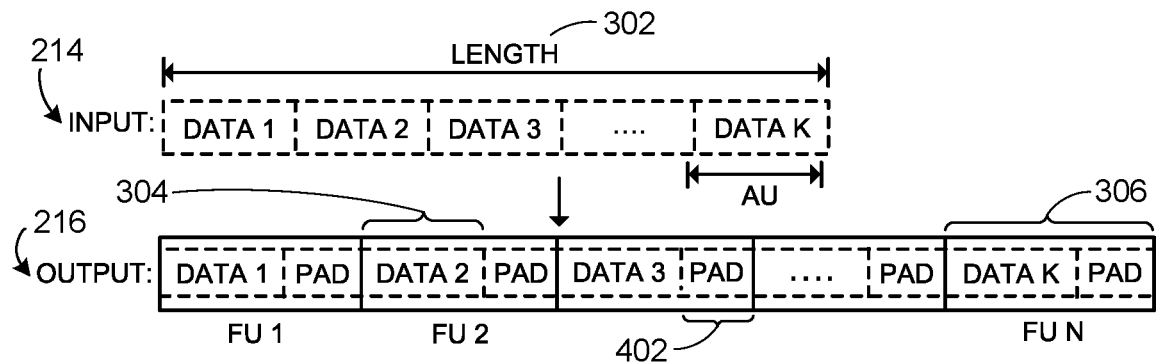
FIG. 4 is an example of an operational view for a split+padding function of the data preprocessor.

Referring now to FIG. 4, therein is shown an example of an operational view for a split+padding function of the data preprocessor 208 of FIG. 2. FIG. 4 depicts the application data 214 as input to the data preprocessor 208 as similarly described in FIG. 3. FIG. 4 also depicts the formatted data 216 as the output of the data preprocessor 208. FIG. 4 depicts one example method of the data formatting performed by the data preprocessor 208 as mentioned in FIG. 2. In this example, the data formatting is a split+padding function or split+padding scheme.

In this example, the split+padding function by the data preprocessor 208 adds data pads 402 to align the application units 304 to the formatted units 306. The alignment of the application units 304 and the formatted units 306 can allow the request distributor 210 of FIG. 2 to send up to K independent in-storage processing application requests 220 to multiple storage devices 218 of FIG. 2 in the storage group 206 of FIG. 2. The term K is an integer. In other words, the alignment allows for each of the multiple storage devices 218 to perform in-storage processing of the application units 304, the formatted units 306, or a combination thereof independently without requiring further formatting or processing required on the formatted data 216.

As a specific example, each of the formatted units 306 includes one of the application units 304 plus one of the data pads 402. Each of the data pads 402 aligns each of the application units 304 to the boundaries of each of the formatted units 306. The data pads 402 can also provide other functions or include other information. For example, the data pads 402 can include error detection or error correction information, such as parity, ECC protection, meta-data, etc.

The data pads 402 can be placed or located in a number of different locations within the formatted units 306. For example, one of the data pads 402 can be located at the end of one of the application units 304 as shown in FIG. 4. Also for example, each of the data pads 402 can also be located at the beginning of each of the formatted units 306 and before each of the application units 304. Further for example, each of the data pads 402 can be distributed, uniformly or non-uniformly, across each of the formatted units 306 and within each of the application units 304.

As an example, the size of each of the data pads 402 can depend on the difference in size between each of the application units 304 and each of the formatted units 306. The data pads 402 can be the same for each of the formatted units 306 or can vary. Further for example, the term size can refer to the number of bits or symbols for the formatted units 306, the application units 304, or a combination thereof. The term size can also refer to the transmission time, recording time, or a combination thereof for the formatted units 306, the application units 304, or a combination thereof.

In this example, the size of the application data 214 is shown to span the transfer length 302 as similarly described in FIG. 3. In this example, the application units 304 are depicted as "Data 1", "Data 2"", "Data 3", and through "Data K". In this example, the formatted units 306 are depicted as "FU 1", "FU 2", and through "FU N".

FIG. 4 depicts the formatted data 216 after a split+padding formatting with the formatted units 306 overlaid visually with the application units 304 and with the data pads 402. An example storage application for this split+padding formatting or scheme can be with use of redundant array of inexpensive disk (RAID) systems as the storage group 206 or with at least some of the multiple storage devices 218 in the storage group 206. The in-storage processing or even the mere storage of the application data 214 can at least involve splitting+padding the application units 304 to different destination devices in the storage group 206.

Continuing with this example, the data preprocessor 208 can split the application data 214 with the data pads 402 into a predefined length, and gives each length to one or more of the storage devices 218 for in-storage processing. A length can include any number of the application units 304. As a specific example, the formatted data 216 of any length can be targeted for one or more of the multiple storage devices 218 in the storage group 206.

Figure 5:
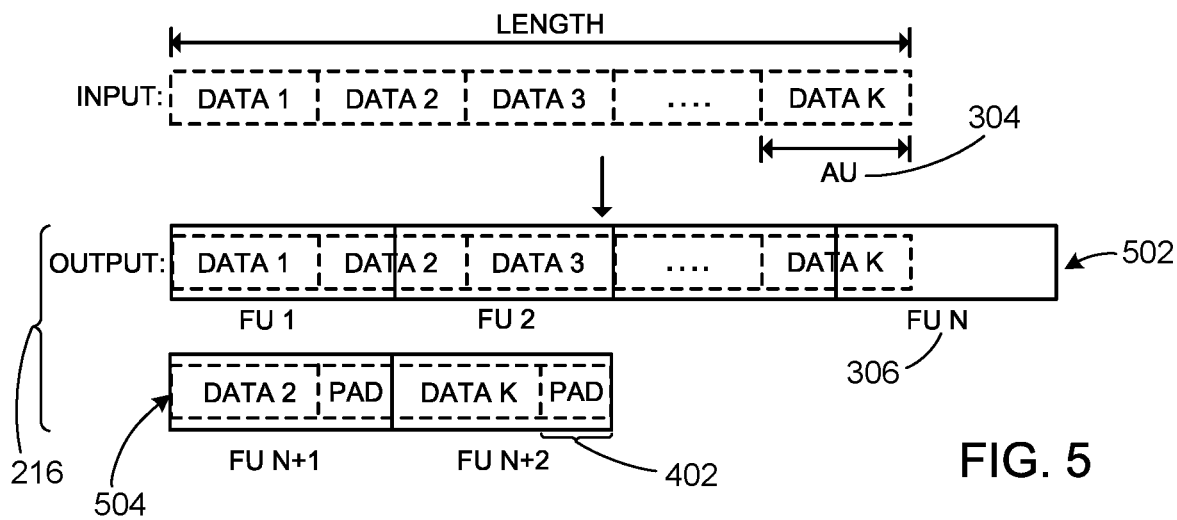
FIG. 5 is an example of an operational view for a split+redundancy function of the data preprocessor.

Referring now to FIG. 5, therein is shown an example of an operational view for a split+redundancy function of the data preprocessor 208 of FIG. 2. FIG. 5 depicts the application data 214 as input to the data preprocessor 208 as similarly described in FIG. 3. The application data 214 can include the application units 304.

FIG. 5 also depicts the formatted data 216 as the output of the data preprocessor 208 as similarly described in FIG. 3. The formatted data 216 can include the formatted units 306.

In this example, the split+redundancy function can process the aligned and non-aligned application units 304. The in-storage processing in each of the storage devices 218 of FIG. 2 in the storage group 206 of FIG. 2 can process the aligned application units 304 separately, the non-aligned application units 304 separately, or both at the same time.

In this example, the data preprocessor 208 is performing the split+redundancy function or the split+redundancy scheme. As part of this function, the split+padding function can split the application data 214 to formatted data 216 of fixed length, variable length, or a combination thereof.

Also part of the split+redundancy function is the redundancy function. For the redundancy function as the example, the data preprocessor 208 does not necessarily need to manipulate the application data 214, the application units 304, or a combination thereof that are non-aligned to the formatted units 306 as the split function described in FIG. 3. This is depicted as the first row of the formatted data 216 in FIG. 5 and is redundancy data 502. The formatted data 216 generated from the split+redundancy function includes the redundancy data 502.

As an example, the redundancy data 502 can be an output of the data preprocessor 208 mapping the application data 214, or as a more specific example the application units 304 to the formatted data 216 and across the formatted units 306 even with some of the application units 304 nonaligned with the formatted units 306. In other words, some of the application units 304 fall within the boundary of one of the formatted units 306 and these application units 304 are considered aligned. Other instances of the application units 304 traverses multiple instances of the formatted units 306 and these application units 304 are considered nonaligned. As a specific example, the application units 304 depicted as "Data 2" and "Data K" each span across two and adjacent instances of the formatted units 306.

Also as an example, the split+redundancy function can also perform the split+padding function to some of the application units 304. The data preprocessor 208 can store the application units 304 that are not aligned to the formatted units 306. This is depicted in the second row of the formatted data 216 of FIG. 5 and is an aligned data 504. For these particular, non-aligned application units 304, the data preprocessor 208 can perform the split+padding function as described in FIG. 4 to form the aligned data 504. In the example depicted in FIG. 5, the application units 304 "Data 2" and "Data K" are not aligned to or traverses multiple instances of the formatted units 306. The aligned data 504 generated by the data preprocessor 208 includes the data pads 402 to these instances of the nonaligned application units 304 in the redundancy data 502.

In this example, the split+redundancy function allows the in-storage processing coordinator 204 to send up to N+M requests to the storage devices 218 in the storage group 206. Both N and M are integers. N represents the number of formatted units 306 in the redundancy data 502. M represents the additional formatted units 306 in the aligned data 504. For the in-storage processing in each of the storage devices 218, the non-aligned application units 304 in the redundancy data 502 can be ignored.

Figure 6:
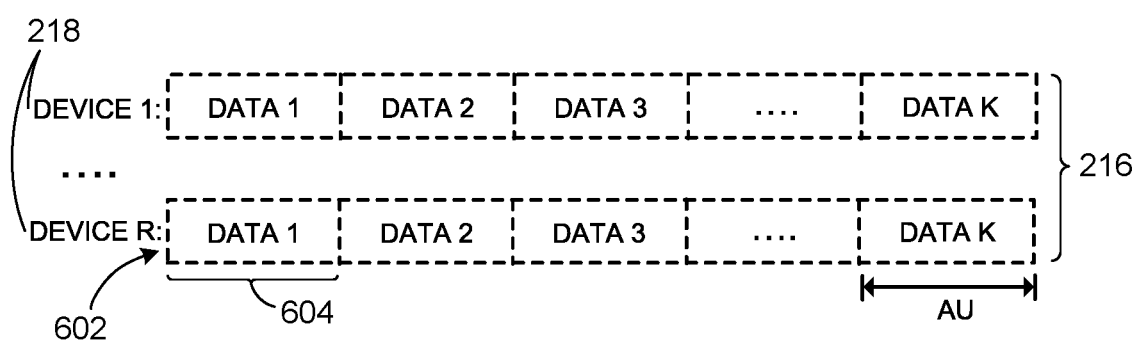
FIG. 6 is an example of an operational view for a mirroring function of the data preprocessor.

Referring now to FIG. 6, therein is shown an example of an operational view for a mirroring function of the data preprocessor 208 of FIG. 2. FIG. 6 depicts the formatted data 216 as the output of the data preprocessor 208 as similarly described in FIG. 3. The formatted data 216 of FIG. 2 can include the formatted units 306 of FIG. 3. The application data 214 of FIG. 3 can be processed by the data preprocessor 208.

When the application data 214 is mirrored in this example, at least some of the storage devices 218 of FIG. 2 can receive all of the application data 214, which are replicated, or also referred to as mirrored. The application data 214 that are replicated are referred to as replica data 602. FIG. 6 depicts the multiple storage devices 218 as "Device 1" through "Device r" for the replica data 602. Replicated units 604 are the application units 304 of FIG. 3 that are replicated and are shown as "Data 1", "Data 2", "Data 3" through "Data K" on "Device 1" through "Device r". One of the storage devices 218 can store the application data 214 as the formatted data 216 for that storage device 218. Some of the other storage devices 218 can store the replica data 602 and the replicated units 604.

In this example, the data preprocessor 208 does not manipulate the application units 304 or the application data 214 as a whole. However, the data preprocessor 208 can collect or store mirroring information and the application units 304. Also, the in-storage processing coordinator 204 can receive the application data 214 or the application units 304 from the application 202 when processing for efficient, concurrent in-storage processing.

The in-storage processing coordinator 204 or the data preprocessor 208 can perform the mirroring functions in a number of ways. As an example, the in-storage processing coordinator 204 or the data preprocessor 208 can take into account factors for mirroring the application data 214 to the formatted data 216. One factor is the number of target devices from the multiple storage devices 218. Another factor is the size of the application data 214, the application units 304 of FIG. 3, or a combination thereof. A further factor is the size of the formatted data 216, the formatted units 306, or a combination thereof.

Figure 7:
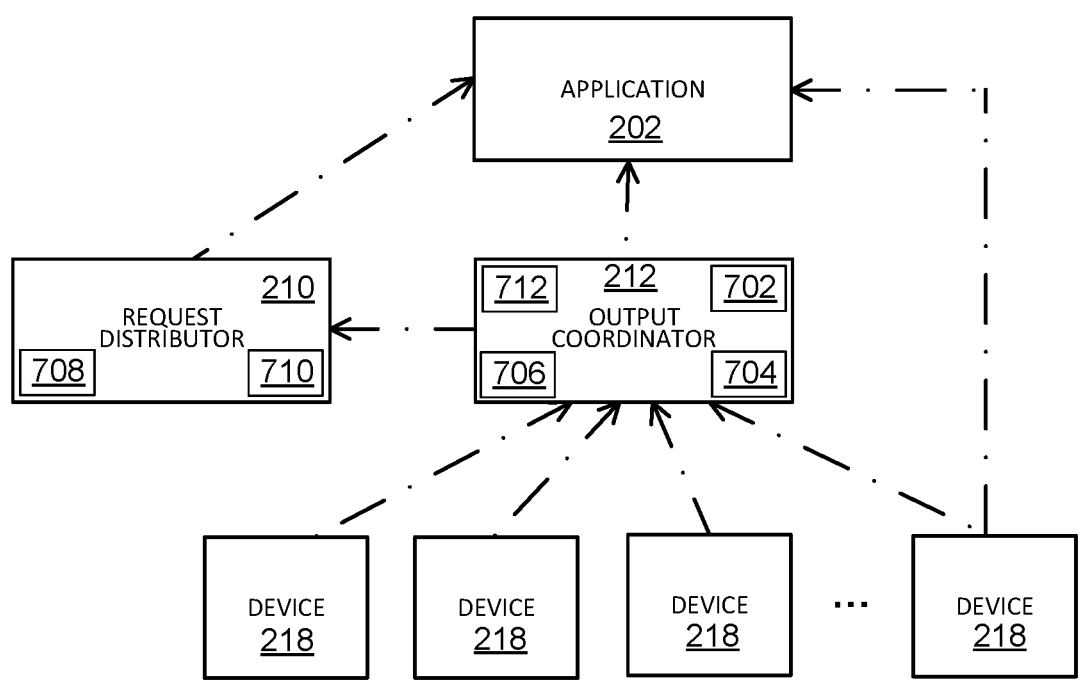
FIG. 7 is an example of an architectural view of the output coordinator.

Referring now to FIG. 7, therein is shown an example of an architectural view of the output coordinator 212. As noted earlier, the output coordinator 212 manages the in-storage processing outputs 224 generated from each of the multiple storage devices 218 of the storage group 206 and sends it back to the application 202. The output coordinator 212 can manage the interaction with the application 202 in a number of ways.

As an example, the output coordinator 212 function can be described as an output harvest 702, an output management 704, and an output retrieval 706. The output harvest 702 is a process for collecting the in-storage processing outputs 224. For example, the output harvest 702 can collect the in-storage processing outputs 224 from each of the storage devices 218 and store them. The storage can be done locally where the output harvest 702 is being executed. Also for example, the output harvest 702 can collect the locations of the in-storage processing outputs 224 in each of the storage devices 218.

The following are examples of various embodiments of how the output coordinator 212, or as a specific example the output harvest 702, can collect the in-storage processing outputs 224 from the storage devices 218. As an example, the output coordinator 212 can fetch the in-storage processing outputs 224 or their locations from each of the storage devices 218 that performed the in-storage processing of the application data 214 of FIG. 2, the formatted data 216 of FIG. 2, or a combination thereof.

As an example, the output coordinator 212 can fetch the in-storage processing outputs 224 in a number of ways. For example, the output coordinator 212 can utilize a direct memory access (DMA) with the storage devices 218. DMA transfers are transfer mechanisms not requiring a processor or a computing resource to manage the actual transfer once the transfer is setup. As another example, the output coordinator 212 can utilized a programed input/output (PIO) with the storage devices 218. PIO transfers are transfer mechanism where a processor or computing resources manages the actual transfer of data and not just the setup and status collection at a termination of the transfer. As a further example, the output coordinator 212 can utilize interface protocol commands, such as SATA vendor specific commands, PCIe, DMA, or Ethernet commands.

As an example, the storage devices 218 can send the in-storage processing outputs 224 to the output coordinator 212 in a number of ways. For example, the output coordinator 212 can utilize the DMA or PIO mechanisms. The DMA can be a remote DMA (rDMA) whereby the transfer is a DMA process from memory of one computer (e.g. the computer running the application 202) into that of another (e.g. one of the storage devices 218 for the in-storage processing) without involving either one's operating system or processor intervention for the actual transfer. As another example, the output coordinator 212 can utilize interface protocol processes, such as background SATA connection or Ethernet.

Also for example, the storage devices 218 can send its respective in-storage processing outputs 224 or their locations to the application 202. This can be accomplished without the in-storage processing outputs 224 passing through the output coordinator 212. For this example, the storage devices 218 and the application 202 can interact in a number of ways, such as DMA, rDMA, PIO, back SATA connection, or Ethernet.

Regarding the output management 704, the output coordinator 212 can manage the order of the outputs from the storage devices 218. The output management 704 manages the outputs based on multiple constraints, such as size of output, storage capacity of output coordinator 212, and types of the application requests 220 of FIG. 2. The outputs can be the in-storage processing outputs 224. As an example, the output management 704 can order the outputs based on various policies.

As a specific example, the outputs or the in-storage processing outputs 224 for each of the sub-application requests 222 of FIG. 2 for in-storage processing can be stored in a sorted order by a sub-request identification 708 per a request identification 710 for the in-storage processing. The request distributor 210 can transform the application request 220 of FIG. 2 into multiple sub-application requests 222 with the formatted data 216 and distributes them to the storage devices 218.

After data processing in each of the storage devices 218, the output coordinator 212 gathers the in-storage processing outputs 224 from each of the storage devices 218. The output coordinator 212 may need to preserve the issuing order of application requests 220, the sub-application requests 222, or a combination thereof even though the in-storage processing outputs 224 from the storage devices 218 can be delivered to the output coordinator 212 in an arbitrary order because the data processing time of the storage devices 218 can be different.

As an example to implement this order, the storage group 206 of FIG. 2 can assign a sequence number to each of the in-storage processing outputs 224, where each of the in-storage processing outputs 224 also can be composed of multiple sub-outputs. For these sub-outputs, the storage group 206 also assigns sequence numbers or sequence identifications. Once the output coordinator 212 receives each of the in-storage processing outputs 224 or sub-output data from each of the storage devices 218, it can maintain each output's sequence thereby sorting them by sequence numbers or identification. If the order of the in-storage processing outputs 224 or the sub-outputs is not important for application 202, the output coordinator 212 can send the in-storage processing outputs 224 in an out of order manner.

The request identification 710 represents information that can be used to demarcate one of the application requests 220 from another. The sub-request identification 708 represents information that can be used to demarcate one of the sub-application requests 222 from another.

As an example, the sub-request identification 708 can be unique or associated with a specific instance of the request identification 710. As a further example, the sub-request identification 708 can be non-constrained to a specific instance of the request identification 710.

As a more specific example, the output coordinator 212 can include and output buffer 712. The output buffer 712 can store the in-storage processing outputs 224 from the storage devices 218. The output buffer 712 can be implemented in a number of ways. For example, the output buffer 712 can be a hardware implementation of a first-in first-out (FIFO) circuit or of a linked list structure. Also for example, the output buffer 712 can be implemented with memory circuitry with the software providing the intelligence for the FIFO operations, such as pointers, status flags, etc.

Also as a specific example, the outputs or the in-storage processing outputs 224 for each of the sub-application requests 222 can be added to the output buffer 712. The in-storage processing outputs 224 can be fetched from the output buffer 712 as long as the output for the desired instance of the sub-application requests 222 is in the output buffer 712. The sub-request identification 708 can be utilized to determine whether the associated in-storage processing output 224 has been stored in the output buffer 712. The request identification 710 can also be utilized, such as an initial determination.

Continuing the example for various embodiments, the output coordinator 212 can collect the in-storage processing output 224 from the storage devices 218. To guarantee the data integrity of the in-storage processing outputs 224, the output coordinator 212 can maintain the sequence of each of the in-storage processing outputs 224 or sub-outputs data in a correct order. For this, the output coordinator 212 can utilize the sub-request identification 708 or the request identification 710 (e.g. if each of the in-storage processing output 224 of each of the storage devices 218 also reuses the same identification as their output sequence number or output sequence identification). Since the processing times of each of the storage devices 218 can be different, the output coordinator 212 can temporarily store each of the in-storage processing outputs 224 or sub-output data into output buffer 712 to make them all sequential (i.e., correct data order). If there exists any missing in-storage processing output 224 or sub-output (that is, a hole in the sequence IDs), the application 202 cannot get the output data until all the in-storage processing outputs 224 are correctly collected in the output buffer 712.

As a further specific example, the outputs or the in-storage processing outputs 224 for each of the sub-application requests 222 can be sent to the application 202 without passing through the output coordinator 212 or the output buffer 712 in the output coordinator 212. In this example, the in-storage processing outputs 224 can be sent from the storage devices 218 without being stored before reaching the application 202.

Regarding the output retrieval 706, once the output or the in-storage processing outputs 224 are known, the application 202 can retrieve the in-storage processing outputs 224 in a number of ways. In some embodiments, the output retrieval 706 can include the in-storage processing outputs 224 passing through the output coordinator 212. In other embodiments, the output retrieval 706 can include the in-storage processing outputs 224 being sent to the application 202 without passing through the output buffer 712.

As an example, the outputs or the in-storage processing outputs 224 can be passed from the storage devices 218 to the output coordinator 212. The output coordinator 212 can store the in-storage processing outputs 224 in the output buffer 712. The output coordinator 212 can then send the in-storage processing outputs 224 to the application 202.

Also as an example, the outputs or the in-storage processing outputs 224 can be passed from the storage devices 218 to the output coordinator 212. The output coordinator 212 can send the in-storage processing outputs 224 to the request distributor 210. The request distributor 210 can send the in-storage processing outputs 224 to the application 202.

In the example, the output buffer 712 can be within the output coordinator 212, the request distributor 210, or a combination thereof.

Further as an example, the outputs or the in-storage processing outputs 224 can be passed from the storage devices 218 to the application 202. In this example, this transfer is direct without the in-storage processing outputs 224 to pass through the output coordinator 212, the request distributor 210, or a combination thereof.

The output coordinator 212 can be implemented in a number of ways. For example, the output coordinator 212 can be implemented in hardware circuitry, such as a processor, an application specific integrated circuit (ASIC) an embedded processor, a microprocessor, a hardware control logic, a hardware finite state machine (FSM), a digital signal processor (DSP), FPGA, or a combination thereof. Also for example, the output coordinator 212 can implemented with software. Further for example, the output harvest 702, the output management 704, the output retrieval 706, or a combination thereof can be implemented with hardware circuitry, with the examples noted earlier, or by software.

Similarly the request distributor 210 can be implemented in a number of ways. For example, the request distributor 210 can be implemented in hardware circuitry, such as a processor, an application specific integrated circuit (ASIC) an embedded processor, a microprocessor, a hardware control logic, a hardware finite state machine (FSM), a digital signal processor (DSP), FPGA, or a combination thereof. Also for example, the output coordinator 212 can implemented with software.

Figures 8A, 8B:
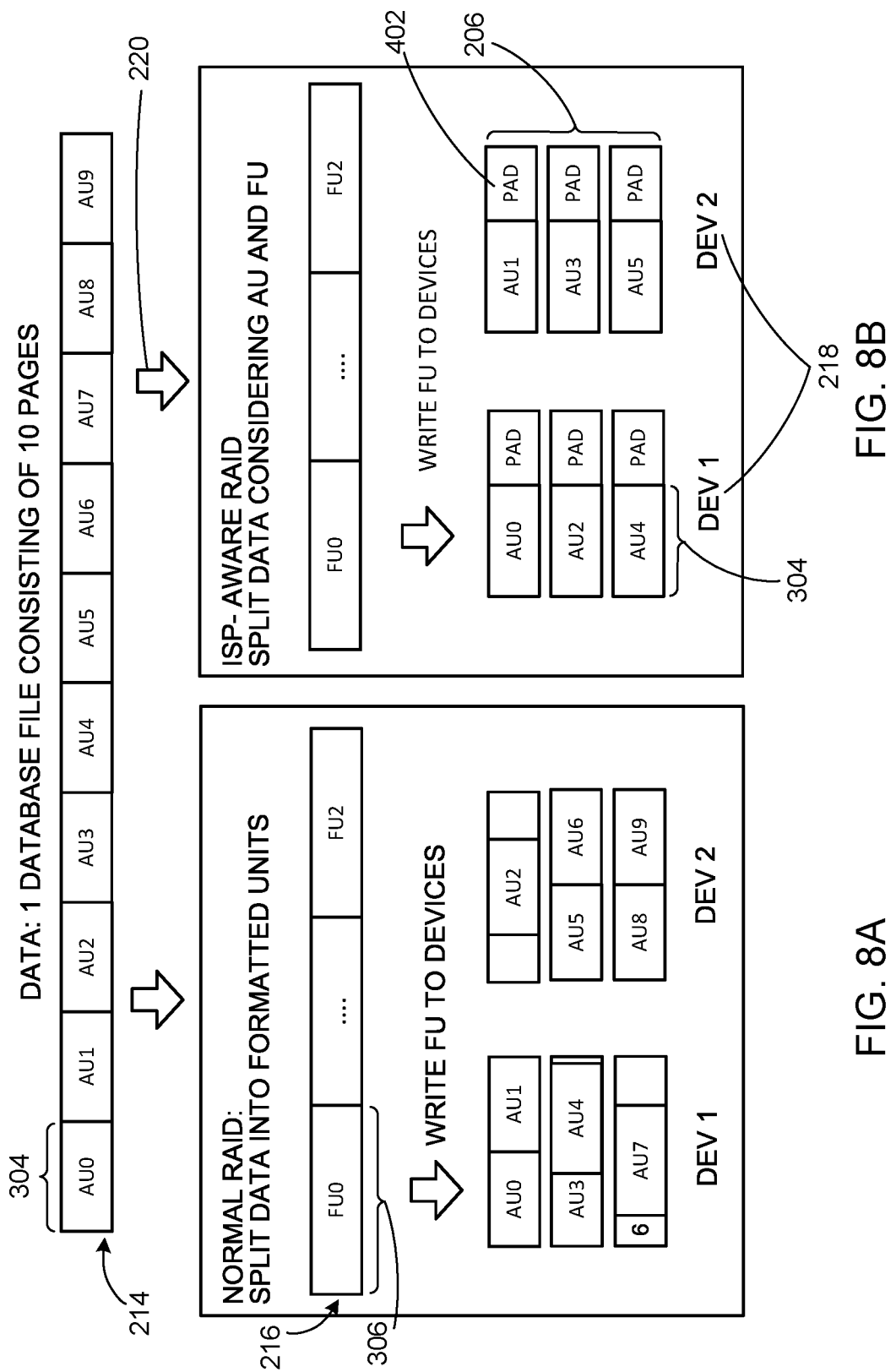
FIGS. 8A and 8B are detailed examples of an operational view of the split and split+padding functions.

Referring now to FIGS. 8A and 8B, therein are shown detailed examples of an operational view of the split and split+padding functions. FIGS. 8A and B depict embodiments for an in-storage processing (ISP)-aware RAID. Various embodiments can be applied to an array configuration for the storage devices 218 of FIG. 2 or the storage group 206 of FIG. 2. Examples of RAID functions include striping, mirroring, or a combination thereof.

FIGS. 8A and 8B depict examples of the application data 214 and the application units 304. The application units 304 can be processed by the in-storage processing coordinator 204 of FIG. 2. FIGS. 8A and 8B each depicts one example.

The example in FIG. 8A depicts the application data 214 undergoing the split function, similarly to the one described in FIG. 3. This depiction can also represent a striping function in a RAID application.

The example in FIG. 8B depicts the application data 214 undergoing a split+padding function, similarly to the one described in FIG. 4. This depiction can also represent a striping function in a RAID application but for various embodiments providing the in-storage processing for split+padding function.

Describing FIG. 8A, this part depicts the formatted data 216 and the formatted units 306. In this example, the formatted data 216 is split and sent to two of the storage devices 218. Each of the formatted units 306 includes one or more of the application units 304, such as FU0 in DEV1, which can include AU0 and AU1. These application units 304, such as AU0, AU1, AU2, AU4, etc., can be each entirely contained in one of the formatted units 306 or traverse or span across multiple formatted units 306, such as AU3, AU6, AU8, etc. As described in FIG. 3, some of the application units 304 are aligned with the formatted units 306 while others are not.

In this example, there are shown 10 of the application units 304 being split into the formatted units 306 that are sent to two of the storage devices 218. In this example application units 304 labeled as AU1, AU3, AU5, AU6, and AU8 are not aligned. These non-aligned application units 304 can be identified with in-storage processing and separately processed by host systems or cooperatively with other storage devices 218. Therefore, the application requests 220 of FIG. 4 for in-storage processing can be serialized and more complex request coordination could be required.

Describing FIG. 8B, this part depicts the formatted data 216 and the formatted units 306, as in FIG. 8A. As in the left-side, this example depicts the formatted data 216 being split in some form and sent to two of the storage devices 218. In this example, each of the application units 304, such as AU0, AU1, AU2, AU3, etc., can be aligned with one of the formatted units 306 with one of the data pads 402, as similarly described in FIG. 4.

In this example for use in ISP-aware RAID, the application units 304 is pre-processed and aligned by split+padding policy, allowing each of the application requests 220 for in-storage processing to be independent. This independence can maximize the opportunity for efficient, concurrent processing since no additional phase of processing is required for the formatted units 306 with the aligned application units 304, compared with the non-aligned units.

Referring now to FIG. 9, therein is shown an example of an architectural view of the computing system 900 in an embodiment. The computing system 900 can be an embodiment of the computing system 100 of FIG. 1.

In this embodiment as an example, FIG. 9 depicts the in-storage processing coordinator 904 in a centralized coordination model. In this model, the in-storage processing coordinator 904 is separate from or external to the host computer 102 and the storage devices 218. The term separate and external represents that the in-storage processing coordinator 904 is in a separate system to the host computer 102 and the storage devices 218 can be housed separate system housing.

In this example, the host computer 102 can be executing the application 202 of FIG. 2. The host computer 102 can also provide file and object services. Further to this example, the in-storage processing coordinator 904 can be included as part of the network 120 of FIG. 1, the data storage system 101 of FIG. 1, implemented external to the host computer 102, or a combination thereof. As previously described in FIG. 2 and other figures earlier, the in-storage processing coordinator 904 can include the request distributor 910, the data preprocessor 908, and the output coordinator 912.

Continuing with this example, each of the storage devices 218 performs the in-storage processing functions. Each of the storage devices 218 can include an in-storage processing engine 922. The in-storage processing engine 922 can perform the in-storage processing for its respective storage device 218.

The storage devices 218 can be located in a number of places within the computing system 100. For example, the storage devices 218 can be located within the data storage system 101 of FIG. 1, as part of the network 120 of FIG. 1, the hard disk drive 116 of FIG. 1 or storage external to the host computer 102, or as part of the network attached storage 122 of FIG. 1.

In various embodiments in a centralized coordination model as in this example, the in-storage processing coordinator 904 can function with the storage devices 218 in a number of ways. For example, the storage devices 218 can be configured to support various functions, such as RAID 0, 1, 2, 3, 4, 5, 6, and object stores.

The in-storage processing engine 922 can be implemented in a number of ways. For example, in-storage processing engine 922 can be implemented with software, hardware circuitry, or a combination thereof. Examples of hardware circuitry can include a processor, an application specific integrated circuit (ASIC) an embedded processor, a microprocessor, a hardware control logic, a hardware finite state machine (FSM), a digital signal processor (DSP), FPGA, or a combination thereof.

Referring now to FIG. 10, therein is shown an example of an architectural view of the computing system 1000 in a further embodiment. The computing system 1000 can be an embodiment of the computing system 100 of FIG. 1.

In this embodiment as an example, FIG. 10 depicts the in-storage processing coordinator 1004 in a centralized coordination model. In this model, the in-storage processing coordinator 1004 is internal to the host computer 102. The term internal represents that the in-storage processing coordinator 1004 is in the same system to the host computer 102 and is generally housed in the same system housing as the host computer 102. This embodiment also has the in-storage processing coordinator 1004 as a separate from or external to the storage devices 218.

In this embodiment as an example, the host computer 102 can include the in-storage processing coordinator 1004 as well as the file object services. In this example, the host computer 102 can execute the application 202 of FIG. 2. As previously described in FIG. 2 and other figures earlier, the in-storage processing coordinator 1004 can include the request distributor 1010, the data preprocessor 1008, and the output coordinator 1012.

Continuing with this example, each of the storage devices 218 performs the in-storage processing function. Each of the storage devices 218 can include an in-storage processing engine 1022. The in-storage processing engine 1022 can perform the in-storage processing for its respective storage device 218.

The storage devices 218 can be located in a number of places within the computing system 100. For example, the storage devices 218 can be located within the data storage system 101 of FIG. 1, as part of the network 120 of FIG. 1, the hard disk drive 116 of FIG. 1 or storage external to the host computer 102 or as part of the network attached storage 122 of FIG. 1.

Various embodiments in a centralized model as in this example, the in-storage processing coordinator 1004 can function with the storage devices 218 in a number of ways. For example, the storage devices 218 can be configured to support various functions, such as RAID 0, 1, 2, 3, 4, 5, 6, and object stores.

The in-storage processing engine 1022 can be implemented in a number of ways. For example, in-storage processing engine 1022 can be implemented with software, hardware circuitry, or a combination thereof. Examples of hardware circuitry can include similar examples as in FIG. 9. The functions for this embodiment will be described in detail later.

Referring now to FIG. 11, therein is shown an example of an architecture view of the computing system 1100 in a yet further embodiment. The computing system 1100 can be an embodiment of the computing system 100 of FIG. 1.

In this embodiment as an example, FIG. 11 depicts the in-storage processing coordinator 1104 in a decentralized coordination model. In this example, the in-storage processing coordinator 1104 is partitioned between the host computer 102 and the storage devices 218. Additional examples of operational flow for this model are described in FIG. 15 and in FIG. 16.

As previously described in FIG. 2 and other figures earlier, the in-storage processing coordinator 1104 can include the request distributor 1110, the data preprocessor 1108, or a combination thereof. In this embodiment as an example, the data preprocessor 1108 and at least a portion of the request distributor 1110 are internal to the host computer 102. The term internal represents that the request distributor 1110 and the data preprocessor 1108 are in the same system to the host computer 102 and housed in the system housing as the host computer 102.

Also, this embodiment has the output coordinator 1112 and at least a portion of the request distributor 1110 separate or external to the host computer 102. As a specific example, this embodiment provides the output coordinator 1112 and at least a portion of the request distributor 1110 as internal to the storage devices 218.

In this example, the host computer 102 can execute the application 202 of FIG. 2. Continuing with this example, each of the storage devices 218 performs the in-storage processing function. Each of the storage devices 218 can include an in-storage processing engine 1122. The in-storage processing engine 1122 can perform the in-storage processing for its respective storage device 218.

The storage devices 218 can be located in a number of places within the computing system 100. For example, the storage devices 218 can be located within the data storage system 101 of FIG. 1, as part of the network 120 of FIG. 1, the hard disk drive 116 of FIG. 1 or storage external to the host computer 102 or as part of the network attached storage 122 of FIG. 1.

In various embodiments in a decentralized model as in this example, this partition of the in-storage processing coordinator 1104 can function with the storage devices 218 in a number of ways. For example, the storage devices 218 can be configured to support various functions, such as RAID 1 and object stores.

The in-storage processing engine 1122 can be implemented in a number of ways. For example, in-storage processing engine 1122 can be implemented with software, hardware circuitry, or a combination thereof. Examples of hardware circuitry can include similar examples as in FIG. 9.

Figure 12:
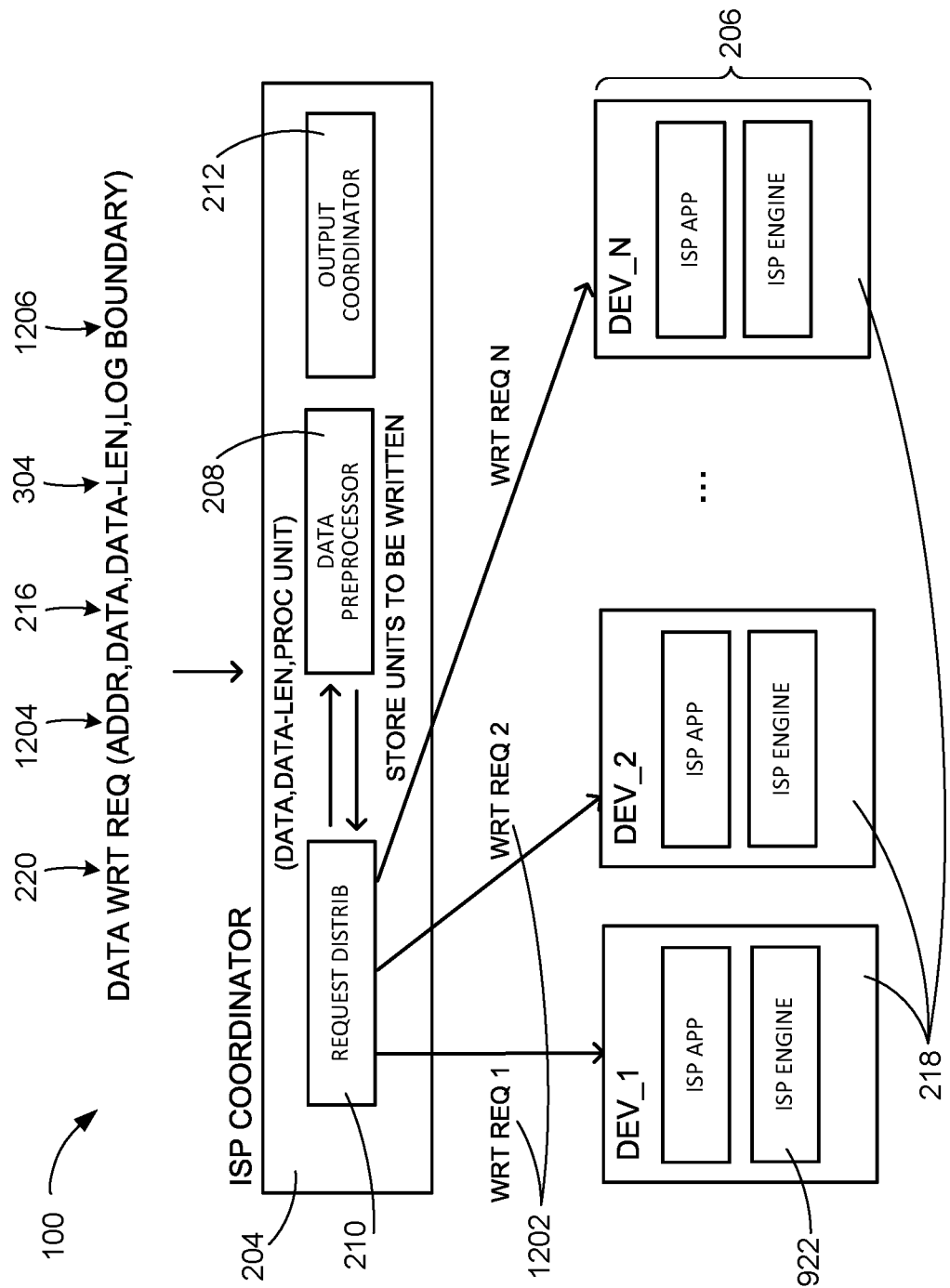
FIG. 12 is an example of an operational view of the computing system issuing device requests for in-storage processing in a centralized coordination model.

Referring now to FIG. 12, therein is shown an example of an operational view of the computing system 100 for in-storage processing in a centralized coordination model. FIG. 12 can represent embodiments for the centralized coordination model described from FIG. 9 or FIG. 10.

FIG. 12 depicts the in-storage processing coordinator 204 and the interaction between the request distributor 210 and the data preprocessor 208 for the centralized coordination model. FIG. 12 also depicts the output coordinator 212. FIG. 12 also depicts the in-storage processing coordinator 204 interacting with the storage devices 218.

As an operational example, FIG. 12 depicts the in-storage processing coordinator 204 issuing the device requests 1202 for in-storage processing, such as write requests to the storage devices 218. The request distributor 210 can receive the application requests 220 of FIG. 2 for writing the application data 214. The request distributor 210 can also receive a data address 1204 as well as the transfer length 302 and a logical boundary 1206 of the application units 304. The data address 1204 can represent the address for the application data 214. The logical boundary 1206 represents the length or size of each of the application units 304.

Continuing with the example, the request distributor 210 can send information to the data preprocessor 208 to translate the application data 214 to the formatted data 216. The request distributor 210 can also send the transfer length 302 for the application data 214. The application data 214 can be sent to the data preprocessor 208 as the application units 304 or the logical boundaries to the application units 304.

Furthering the example, the data preprocessor 208 can translate the application data 214 or the application units 304 to generate the formatted data 216 or the formatted units 306 of FIG. 3. Examples of the types of translation can be one of the methods described in FIG. 2 and FIG. 3 through FIG. 6. The data preprocessor 208 can return the formatted data 216 or the formatted units 306 to the request distributor 210. The request distributor 210 can generate and issue device requests 1202 for writes to the storage devices 218 based on the formatting policies and policy for storing or for in-storage processing of the formatted data 216 or the formatted units 306. The device requests 1202 are based on the application requests 220.

Further continuing with the example, each of the storage devices 218 can include an in-storage processing function or application and the in-storage processing engine 922. Each of the storage devices 218 can receive the device requests 1202 and at least a portion of the formatted data 216.

For illustrative purposes, although FIG. 12 depicts the device requests 1202 being issued to all of the storage devices 218, it is understood that the request distributor 210 can operate differently. For example, the device requests 1202 can be issued to some of the storage devices 218 and not necessarily to all of them. Also for example, the device requests 1202 can be issued at different times or can be issued as part of the error handling examples as discussed in FIG. 2.

As a specific example for a centralized coordination model, the in-storage processing coordinator 204 can receive all the application requests 220 from the application 202, can issue all the device requests 1202 to the storage devices 218, or a combination thereof. The request distributor 210 can send or distribute the device requests 1202 to multiple storage devices 218 based on a placement scheme. The output coordinator 212 can collect and manage the in-storage processing outputs 224 from the storage devices 218. The output coordinator 212 can then send the in-storage processing outputs 224 to the application 202 of FIG. 2 as similarly described in FIG. 7.

Figure 13:
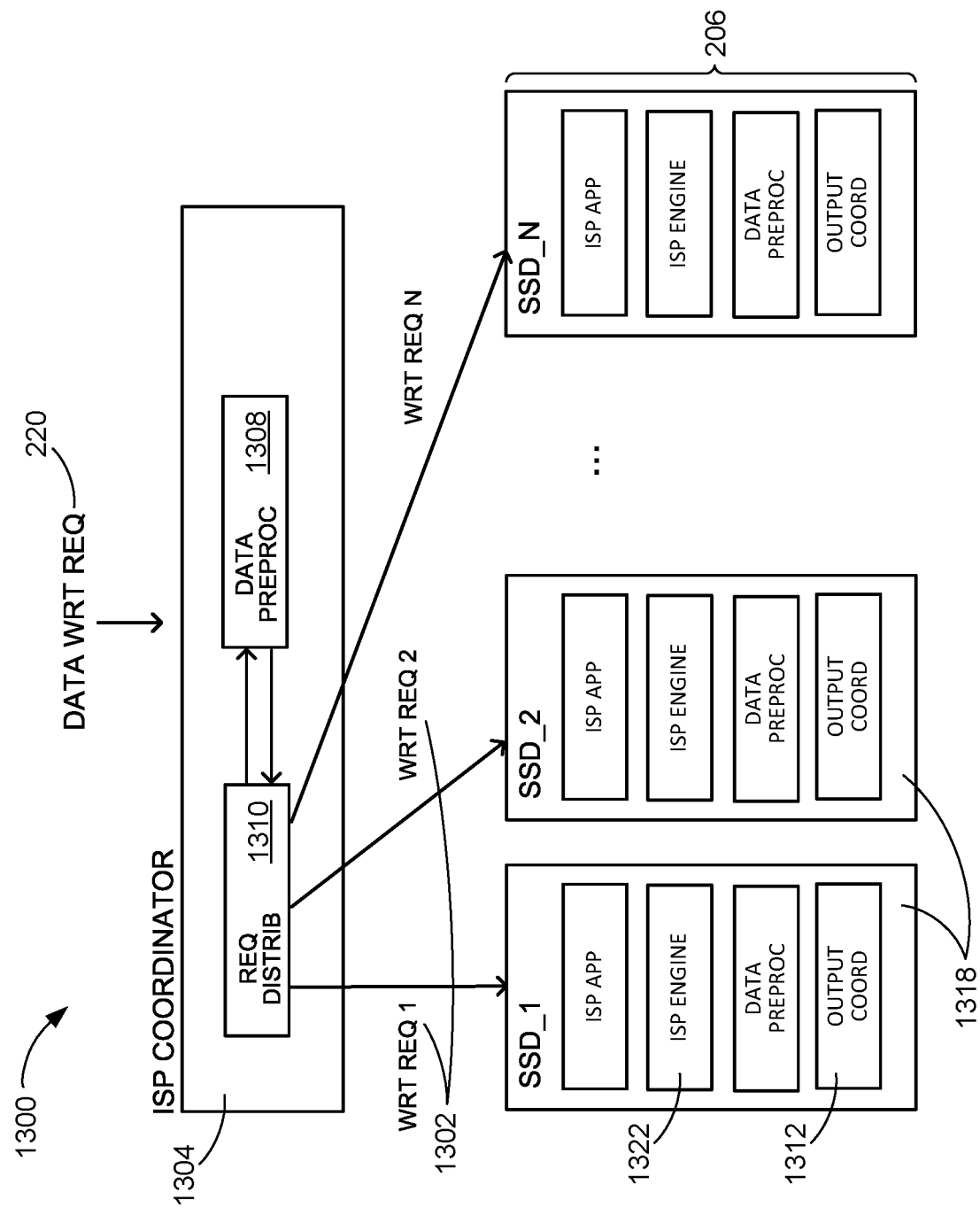
FIG. 13 is an example of an operational view of the computing system issuing device requests for in-storage processing in a decentralized coordination model.

Referring now to FIG. 13, therein is shown an example of an operational view of the computing system 1300 issuing data write requests to the storage devices 1318 for in-storage processing in a decentralized coordination model. The computing system 1300 can include similarities to the computing system 1100 of FIG. 11. FIG. 13 depicts the in-storage processing coordinator 1304 including the request distributor 1310 and the data preprocessor 1308.

Both FIG. 12 and FIG. 13 depict an example of an operational view of computing system 1300 in terms of storing data to the storage devices 218. That is, both FIGS. 12 and 13 focus on how to efficiently store data across the storage devices 218 for in-storage processing.

FIG. 13 also depicts the output coordinator 1312 and a portion of the request distributor 1310 in each of the devices 1318. FIG. 13 also depicts the in-storage processing coordinator 1304 interacting with the devices 1318.

As an operational example, FIG. 13 depicts the in-storage processing coordinator 1304 issuing the device requests 1302 as write requests to the devices 1318. The request distributor 1310 in the in-storage processing coordinator 1304 can receive the application requests 220 of FIG. 2 for writing the application data 214 of FIG. 2. The request distributor 1310 can also receive a data address 1204 as well as the transfer length 302 of FIG. 3 and the logical boundary of the application units 304 of FIG. 3. The data address 1204 can represent the address for the application data 214.

Continuing with the example, the request distributor 1310 can send information to the data preprocessor 1308 to translate the application data 214 to the formatted data 216 of FIG. 2. The request distributor 1310 can also send the transfer length 302 for the application data 214. The application data 214 can be sent as the application units 304 or the logical boundaries to the application units 304 to the data preprocessor 1308.

Furthering the example, the data preprocessor 1308 can translate the application data 214 or the application units 304 to generate the formatted data 216 or the formatted units 306 of FIG. 3. Examples of the types of translation can be one of the methods described in FIG. 2 and FIG. 3 through FIG. 6. The data preprocessor 1308 can return the formatted data 216 or the formatted units 306 to the request distributor 1310 in the in-storage processing coordinator 1304. The request distributor 1310 can generate and issue the application requests 220 for writes to the devices 1318 based on the formatting policies and policy for storing or for in-storage processing of the formatted data 216 or the formatted units 306.

Further continuing with the example, each of the devices 1318 can include an in-storage processing function or application and the in-storage processing engine 1322. Each of the devices 1318 can receive the device requests 1302 and at least a portion of the formatted data 216. Each of the devices 1318 can also include the output coordinator 1312, a portion of the request distributor 1310, or a combination thereof.

For illustrative purposes, although FIG. 13 depicts the device requests 1302 being issued to all of the devices 1318, it is understood that the request distributor 1310 can operate differently. For example, the device requests 1302 can be issued to some of the devices 1318 and not necessarily to all of them. Also for example, the device requests 1302 can be issued at different times or can be issued as part of the error handling examples as discussed in FIG. 2.

As a specific example for a decentralized coordination model, the in-storage processing coordinator 1304 can receive the application requests 220 from the application 202, can issue the device requests 1302 to the devices 1318, or a combination thereof. The request distributor 1310 in the in-storage processing coordinator 1304 can send or distribute the device requests 1302 to multiple devices 1318 based on a placement scheme.

Continuing with the specific example, the request distributor 1310 in each of the devices 1318 can receive the request from the in-storage processing coordinator 1304. The output coordinator 1312 can collect and manage the in-storage processing outputs 224 from the devices 1318 or one of the devices 1318.

Also as a specific example for a decentralized coordination model, there are various communication methods depending on the configuration of the storage group 206. The functions of the request distributor 1310 and the output coordinator 1312 in the devices 1318 in a decentralized coordination model will be described later.

Figure 14:
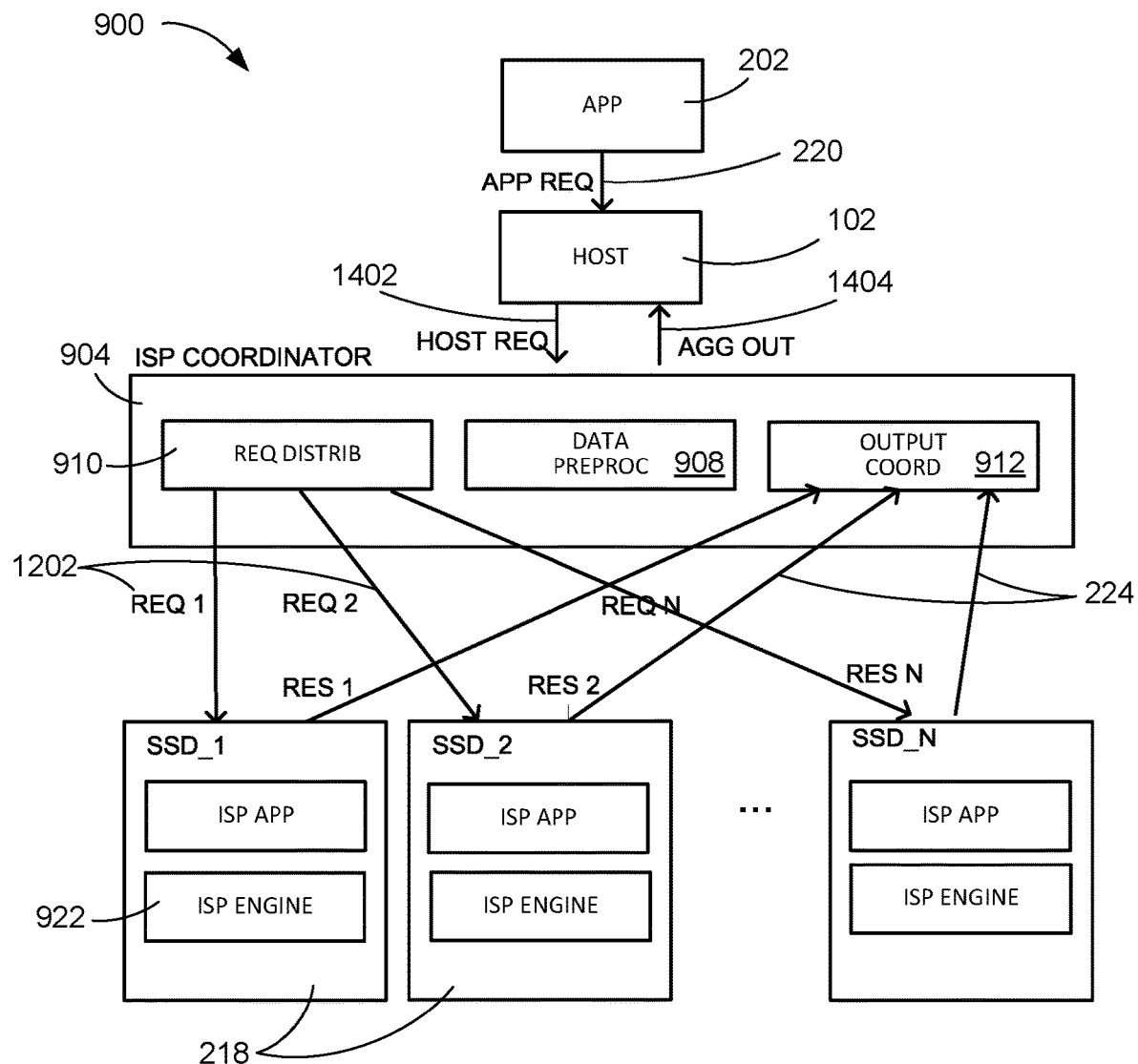
FIG. 14 is an operational view for the computing system of a centralized coordination model.

Referring now to FIG. 14, therein is shown an operational view for the computing system 100 for in-storage processing in a centralized model. FIG. 14 depicts the in-storage processing coordinator 904 to be external to both the host computer 102 and the storage devices 218. Although the application 202 is shown outside of the host computer 102, it is understood that the application 202 can be executed by the host computer 102 as well as outside of the host computer 102. In addition, although the in-storage processing coordinator 904 is external to the host in FIG. 14, it is also understood that the in-storage processing coordinator 904 can be internal to the host, like in FIG. 10.

Figure 15:
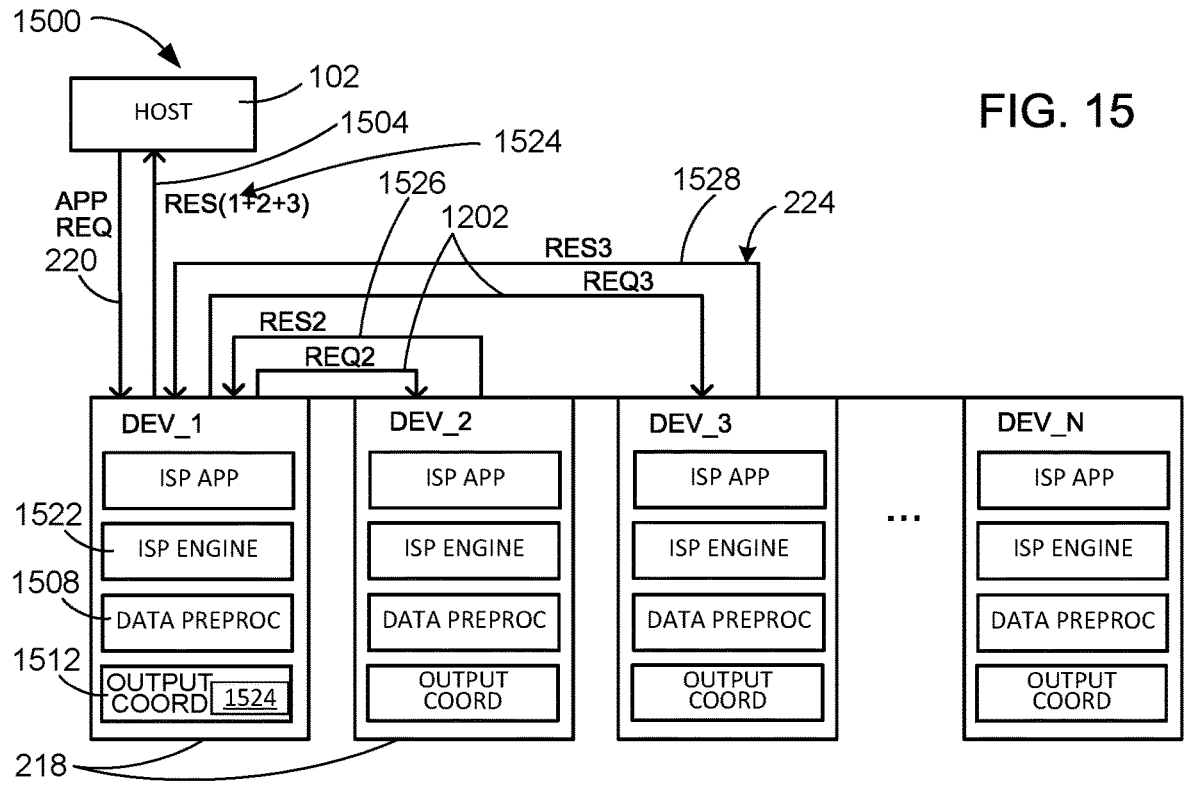
FIG. 15 is an operational view for a computing system in a decentralized model in an embodiment with one output coordinator
Figure 16:
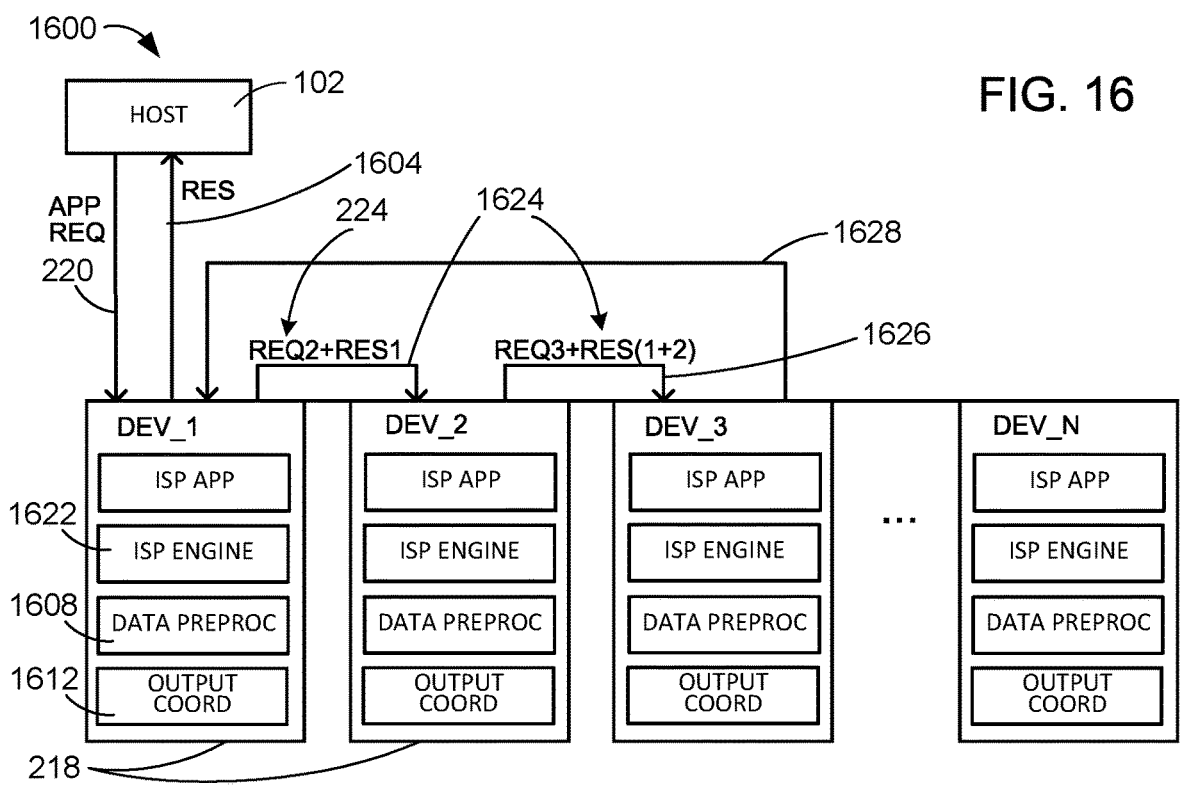
FIG. 16 is an operational view of a computing system in a decentralized model in an embodiment with multiple output coordinators.

FIG. 14, FIG. 15, and FIG. 16 depict an example of an operational view of computing system 1300 of FIG. 13 in terms of processing data in the storage devices 218. That is, FIGS. 14, 15, and 16 focus on how to efficiently process/compute the stored data in the storage devices 218 with in-storage processing techniques.

In this example, the application 202 can issue application requests 220 for in-storage processing to the host computer 102. The host computer 102 can issue host requests 1402 based on the application requests 220 from the application 202. The host requests 1402 can be sent to the in-storage processing coordinator 904.

The in-storage processing coordinator 904 can translate the application data 214 of FIG. 2 and the application units 304 of FIG. 3 to generate the formatted data 216 of FIG. 2 and the formatted units 306 of FIG. 3. The in-storage processing coordinator 904 can also generate the device requests 1202 to the storage devices 218. The in-storage processing coordinator 904 can also collect and manage the in-storage processing outputs 224 from the storage devices 218, and can deliver an aggregated output 1404 back to the host computer 102, the application 202, or a combination thereof. The aggregated output 1404 is the combination of the in-storage processing outputs 224 from the storage devices 218. The aggregated output 1404 can be more than concatenation of the in-storage processing outputs 224.

As a specific example, the in-storage processing coordinator 904 can include the request distributor 910. The request distributor 910 can receive the application requests 220 as the host requests 1402. The request distributor 910 can generate the device requests 1202 from the host requests 1402. The request distributor 910 can also generate the sub-application requests 222 of FIG. 7 as the device requests 1202.

As a further specific example, the in-storage processing coordinator 904 can include the data preprocessor 908. The data preprocessor 908 can receive the information from the application requests 220 or the host requests 1402 through the request distributor 910. The data preprocessor 908 can format the application data 214 as appropriate based on the placement scheme onto the storage devices 218.

Also as a specific example, the in-storage processing coordinator 904 can include the output coordinator 912. The output coordinator 912 can receive the in-storage processing outputs 224 from the storage devices 218. The output coordinator 912 can generate the aggregated output 1404 with the in-storage processing outputs 224. In this example, the output coordinator 912 can return the aggregated output 1404 to the host computer 102. The host computer 102 can also return the aggregated output 1404 to the application 202. The application 202 can continue to execute and utilize the in-storage outputs 224, the aggregated output 1404, or a combination thereof.

In this example, each of the storage devices 218 includes the in-storage processing engine 922. The in-storage processing engine 922 can receive and operate on specific instance of the device requests 1202. The in-storage processing engine 922 can generate in-storage processing output 224 to be returned to the in-storage processing coordinator 904 or as a specific example to the output coordinator 912.

Referring now to FIG. 15, therein is shown an operational view for a computing system 1500 in a decentralized model in an embodiment with one output coordinator 1512. The computing system 1500 can be the computing system 1100 of FIG. 11.

As an operational overview of this embodiment, the host computer 102 can issue an application request 220 to the storage devices 218 for in-storage processing. The host computer 102 and the storage devices 218 can be similarly partitioned as described in FIG. 11. Each of the storage devices 218 can perform the in-storage processing. Each of the storage devices 218 can provide its in-storage processing output 224 to the storage device 218 that received the application request 220 from the host computer 102. This storage device 218 can then return an aggregated output 1504 back host computer 102, the application 202, or a combination thereof. The application 202 can continue to execute and utilize the in-storage outputs 224, the aggregated output 1504, or a combination thereof.

Continuing with the example, the application request 220 can be issued to one of the storage devices 218. That one storage device 218 can issue the application request 220 or a device request 1202 to the other storage devices 218. As an example, the storage device 218 that received the application request 220 can decompose the application request 220 to partition the in-storage processing to the other storage devices 218. The device request 1202 can be that partitioned request based off the application request 220 and the in-storage processing execution by the previous storage devices 218.

This example depicts a number of the devices labeled as "DEV_1", "DEV_2", "DEV_3", and through "DEV_N". The term "N" in the figure is an integer. The storage devices 218 in this example can perform in-storage processing. Each of the storage devices 218 are shown including an in-storage processing engine 1522, a data preprocessor 1508, and an output coordinator 1512.

For illustrative purposes, all of the storage devices 218 are shown with the output coordinator 1512, although it is understood that the computing system 1500 can partitioned differently. For example, only one of the storage devices 218 can include the output coordinator 1512. Further for example, the output coordinator 1512 in each of the storage devices 218 can operate differently from another. As a specific example, the output coordinator 1512 in DEV_2 through DEV_N can act as pass through to the next storage device 218 or to return the in-storage processing output 224 back to DEV_1. Each of the storage devices 218 can manage it request identification 710 of FIG. 7, the sub-request identification 708 of FIG. 7, or a combination thereof.

In this example, the host computer 102 can send the application request 220 to one of the storage devices 218 labeled DEV_1. The in-storage processing engine 1522 in DEV_1 can perform the appropriate level of in-storage processing and generates the in-storage processing output 224. In this example, the in-storage processing output 224 from DEV_1 can be referred to as a first output 1524.

Continuing with this example, the data preprocessor 1508 in DEV_1 can format or translate the information from the application request 220 that will be forwarded to DEV_2, DEV_3, and through to DEV_N. The in-storage processing engine 1522 in DEV_2 can generate the in-storage processing output 224 and can be referred to a second output 1526. The output coordinator 1512 in the DEV_2 can send the second output 1528 to DEV_1. The in-storage processing engine 1522 in DEV_3 can generate the in-storage processing output 224 and can be referred to a third output 1528.

The output coordinator 1512 in the DEV_3 can send the third output 1528 to DEV_1. The in-storage processing engine 1522 in DEV_N can generate the in-storage processing output 224 and can be referred to an Nth output. The output coordinator 1512 in the DEV_N can send the Nth output to DEV_1. The output coordinator 1512 in DEV_1 generates the aggregated output 1504 that includes the first output 1524, the second output 1526, the third output 1528, and through the Nth output.

Referring now to FIG. 16, therein is shown an operational view for a computing system 1600 in a decentralized model in an embodiment with multiple output coordinators 1612. The computing system 1600 can be the computing system 1100 of FIG. 11.

As an operational overview of this embodiment, the host computer 102 can issue an application request 220 to storage devices 218 for in-storage processing. The host computer 102 and the storage devices 218 can be similarly partitioned as described in FIG. 11. The application request 220 can be issued to one of the storage devices 218. That storage device 218 then performs the in-storage processing. The execution of the application request 220 and the in-storage processing results is issued or sent to another of the storage devices 218. This process can continue until all the storage devices 218 performed the in-storage processing and the last of the storage devices 218 can return the result to the first of the storage devices 218. That first of the storage devices 218 then returns an aggregated output 1604 back host computer 102, the application 202, or a combination thereof. The application 202 can continue to execute and utilize the in-storage outputs 224 of FIG. 2, the aggregated output 1604, or a combination thereof.

For illustrative purposes, this embodiment is described with DEV_1 providing the aggregated output 1604 to the host computer 102, although it is understood that this embodiment can operate differently. For example, the last device or DEV_N in this example can provide the aggregated output 1604 back to the host computer 102 instead of DEV_1.

This example depicts a number of the storage devices 218 labeled as "DEV_1", "DEV_2", "DEV_3", and through "DEV_N". The term "N" in the figure is an integer. The storage devices 218 in this example can perform in-storage processing. Each of the storage devices 218 are shown including an in-storage processing engine 1622, a data preprocessor 1608, and an output coordinator 1612.

For illustrative purposes, all of the storage devices 218 are shown with the output coordinator 1612, although it is understood that the computing system 1600 can partitioned differently. For example, only one of the storage devices 218 can include the output coordinator 1612 with full functionality. Further for example, the output coordinator 1612 in each of the storage devices 218 can operate differently from another. As a specific example, the output coordinator 1612 in DEV_2 through DEV_N can act as pass through to the next storage device 218 or to return the aggregated output 1604 back to DEV_1.

In this example, the host computer 102 can send the application request 220 to one of the storage devices 218 labeled DEV_1. The in-storage processing engine 1622 in DEV_1 can perform the appropriate level of in-storage processing and can generate the in-storage processing output 224. In this example, the in-storage processing output 224 from DEV_1 can be referred to a first output 1624. In this example, the DEV_1 can decompose the application request 220 to partition the in-storage processing to DEV_2. The device request 1202 of FIG. 12 can be that partitioned request based off the application request 220 and the in-storage processing execution DEV_1. This process of decomposing and partitioning can continue through DEV_N.

Continuing with this example, the data preprocessor 1608 in DEV_1 can format or translate the information from the application request 220 that will be forwarded to DEV_2. The data preprocessor 1608 in DEV_1 can also format or translate the in-storage processing output 224 from DEV_1 or the first output 1624.

Furthering this example, the output coordinator 1612 in DEV_1 can send the output of the data preprocessor 1608 in DEV_1, the first output 1624, a portion of the application request 220, or a combination thereof to DEV_2. DEV_2 can continue the in-storage processing of the application request 220 sent to DEV_1.

Similarly, the in-storage processing engine 1622 in DEV_2 can perform the appropriate level of in-storage processing based on the first output 1624 and can generate the in-storage processing output 224 from DEV_2. In this example, the in-storage processing output 224 from DEV_2 can be referred to a second output 1626 as "a partial aggregated output."

Continuing with this example, the data preprocessor 1608 in DEV_2 can format or translate the information from the application request 220 or the second output 1626 that will be forwarded to DEV_3. The data preprocessor 1608 in DEV_2 can also format or translate the in-storage processing output 224 from DEV_2 or the second output 1626.

Furthering this example, the output coordinator 1612 in DEV_2 can send the output of the data preprocessor 1608 in DEV_2, the second output 1626, a portion of the application request 220, or a combination thereof to DEV_3. DEV_3 can continue the in-storage processing of the application request 220 sent to DEV_1.

Similarly, the in-storage processing engine 1622 in DEV_3 can perform the appropriate level of in-storage processing based on the second output 1626 and can generate the in-storage processing output 224 from DEV_3. In this example, the in-storage processing output 224 from DEV_3 can be referred to a third output 1628.

Continuing with this example, the data preprocessor 1608 in DEV_3 can format or translate the information from the application request 220 or the third output 1628 that will be forwarded to DEV_1. The data preprocessor 1608 in DEV_2 an also format or translate the in-storage processing output 224 from DEV_3 or the third output 1628.

Furthering this example, the output coordinator 1612 in DEV_3 can send the output of the data preprocessor 1608 in DEV_3, the third output 1628, a portion of the application request 220, or a combination thereof to DEV_1. DEV_1 can return to the host computer 102 or the application 202 the aggregated output 1604 based on the first output 1624, the second output 1626, and the third output 1628.

In this example, in-storage processing by one of the storage devices 218 that follows a previous storage device 218 can aggregate the in-storage processing outputs 224 of the storage devices 218 that preceded it. In other words, the second output 1626 is an aggregation of the in-storage processing output 224 from the DEV_2 as well as the first output 1624. The third output 1628 is an aggregation of the in-storage processing output from DEV_3 as well as the second output 1626.

Figure 17:
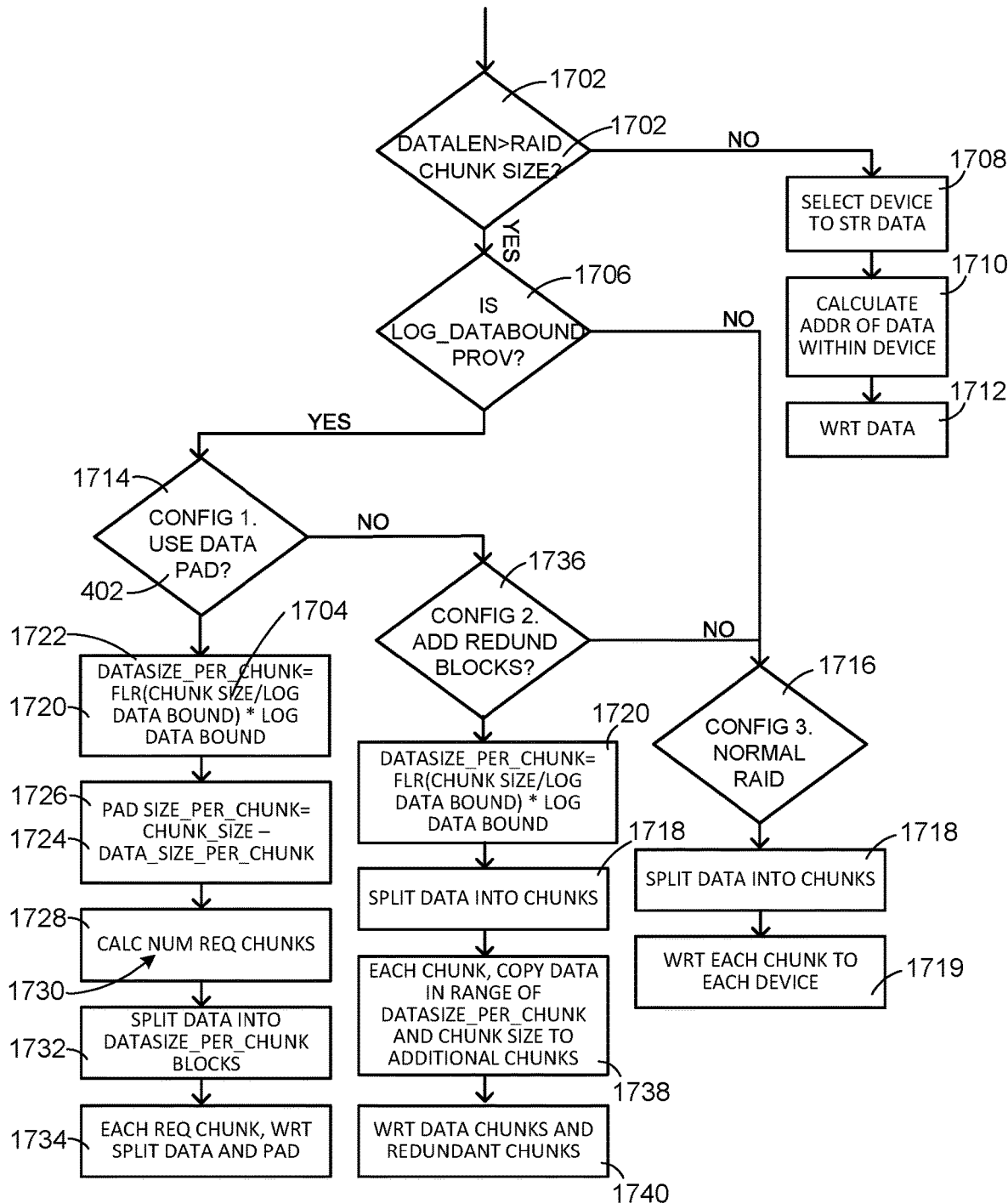
FIG. 17 is an example of a flow chart for the request distributor and the data preprocessor.

Referring now to FIG. 17, therein is shown an example of a flow chart for the request distributor 210 and the data preprocessor 208. The request distributor 210 and the data preprocessor 208 can be operated in a centralized or decentralized model as described earlier, as examples.

As an overview of this example, this flow chart depicts how the application data 214 of FIG. 2 can be translated to the formatted data 216 of FIG. 2 based on the storage policies. As examples, the storage policies can include the split policy, the split+padding policy, the split+redundancy policy, and storage without any chunking of the application units 304 of FIG. 3 to the formatted units 306 of FIG. 3. This example can represent the application request 220 of FIG. 2 as a write request.

The request distributor 210 of FIG. 2 can receive the application request 220 directly or some form the application request 220 through the host computer 102 of FIG. 1. The application request 220 can include information such as the data address 1204 of FIG. 12, the application data 214, the transfer length 302 of FIG. 3, the logical boundary 1206 of FIG. 12, or a combination thereof.

As an example, the request distributor 210 can execute a chunk comparison 1702. The chunk comparison 1702 compares the transfer length with a chunk size 1704 of the storage group 206, in this example operating as a RAID system. The chunk size 1704 represents a discrete unit of storage size to be stored in the storage devices 218 of FIG. 2 in the storage group 206 of FIG. 2. As an example, the chunk size 1704 can represent the size of one of the formatted units 306.

If the chunk comparison 1702 determines the transfer length 302 is greater than the chunk size 1704, the handling of the application request 220 can continue to a boundary query 1706. If the chunk comparison 1702 determines that the transfer length is not greater than the chunk size 1704, the handling of the application request 220 can continue to a device selection 1708.

The branch of the flow chart starting with the device selection 1708 represents the handling of the application data 214 without chunking of the application units 304 or the application data 214. An example of this can be the mirroring function as described in FIG. 6.

Continuing with this branch of the flow chart, the device selection 1708 determines which of the storage devices 218 in the storage group 206 will store the application data 214 as part of the application request 220. The request distributor 210 can generate the device requests 1202 of FIG. 12 as appropriate based on the application request 220.

When the logical boundary 1206 of FIG. 12 for the application units 304 are included with the application request 220, the request distributor 210 can distribute the application request 220 by splitting the application request 220 to sub-application requests 222 of FIG. 2 or by sending identical application requests 220 to multiple storage devices 218.

In the example for the sub-application requests 222, each of the sub-application requests 222 can make the size of each of the sub-application requests 222 to be a multiple of the logical boundary 1206 of the application units 304. The sub-application requests 222 can be the device requests 1202 issued to the storage devices 218.

In the example for identical application requests 220, multiple storage devices 218 can receive these application requests 220. The first in-storage processing output 224 of FIG. 2 returned can be accepted by the output coordinator 212 of FIG. 2 to be returned back to the application 202. The identical application requests 220 can be the device requests 1202 issued to the storage devices 218.

When the logical boundary 1206 for the application units 304 is not included, the request distributor 210 can split the application request 220 to the sub-application requests 222. These sub-application requests 222 make the size of each of these requests to be an arbitrary length. The requests can be handled as a split function by the data preprocessor 208. The sub-application requests 222 can be the device requests 1202 issued to the storage devices 218.

The request distributor 210, the data preprocessor 208, or a combination thereof can continue from the device selection 1708 to an address calculation 1710. The address calculation 1710 can calculate the address for the application data 214 or the formatted data 216 to be stored in the storage devices 218 receiving the device requests 1202. For illustrative purposes, the address calculation 1710 is described being performed by the request distributor 210 or the data preprocessor 208, although it is understood that the address calculation 1710 can be performed elsewhere. For example, the storage devices 218 receiving the device requests 1202 can perform the address calculation 1710. Also for example, the address can be a pass-through from the application request 220 in which case the address calculation 1710 could have been performed by the application 202 of FIG. 2 or by the host computer 102.

The flow chart can continue to a write non-chunk function 1712. Each of the storage devices 218 receiving the device request 1202 can write the application data 214 or the formatted data 216 on the storage device 218. Since each of the storage devices 218 contain the application data 214 in a complete or non-chunked form, any of the application data 214 or the formatted data 216 can undergo in-storage processing by the storage device 218 with the application data 214.

Returning to the branch of the flow chart from the boundary query 1706, the boundary query 1706 determines if the logical boundary 1206 is provided in the application request 220, as an example. If the boundary query 1706 determines that the logical boundary 1206 is provided, the flow chart can continue to a padding query 1714. If the boundary query 1706 determines that the logical boundary 1206 is not provided, the flow chart can continue to a normal RAID query 1716.

The branch of the flow chart starting with the normal RAID query 1716 represents the handling of the application data 214 with chunking of the application units 304 (or some of the application units 304). An example of this can be the split function described in FIG. 3. As an example, this branch of the flow chart can be used for unstructured application data 214 or for application data 214 with no logical boundary 1206. The chunk size 1704 can be with a fixed size or a variable-length size.

Continuing with this branch of the flow chart, the normal RAID query 1716 determines if the application request 220 is for a normal RAID function as the in-storage processing, or not. If so, the flow chart can continue to a chunk function 1718. If not the flow chart can continue to another portion of the flow chart or can return an error status back to the application 202.

In this example, the chunk function 1718 can split the application data 214 or the application units 304 or some portion of them in the chunk size 1704 for the storage devices 218 to receive the application data 214. As an example, the data preprocessor 208 can perform the chunk function 1718 to generate the formatted data 216 or the formatted units 306 with the application data 214 translated to the chunk size 1704. The data preprocessor 208 can interact with the request distributor 210 to issue the device requests 1202 to the storage devices 218.

For illustrative purposes, the chunk function 1718 is described as being performed by the data preprocessor 208, although it is understood that the chuck function 1718 can be executed differently. For example, the storage devices 218 receiving the device requests 1202 can perform the chunk function 1718 as part of the in-storage processing at the storage devices 218.

In this example, the flow chart can continue to a write chunk function 1719. The write chunk function 1719 is an example of the in-storage processing at the storage devices 218. The write chunk function 1719 writes the formatted data 216 or the formatted units 306 at the storage devices 218 receiving the device requests 1202 from the request distributor 210.

Returning to the branch of the flow chart from the padding query 1714, the branch below the padding query 1714 represents the handling of the application data 214 or the application units 304 or a portion thereof with the data pads 402. An example of this can be the split+padding function as described in FIG. 4.

The padding query 1714 determines if the application data 214 or the application units 304 or some portion of them should be padded to generate the formatted data 216 or the formatted units 306. The data preprocessor 208 can perform the padding query 1714.

When the padding query 1714 determines that padding of the application units 304 is needed, the flow chart can continue to an application data sizing 1720. The application data sizing 1720 calculates a data size 1722 of the application data 214 for the split–padding function. The data size 1722 is the amount of the application data 214 to be partitioned for the formatted data 216. As an example, the application data sizing 1720 can determine the data size 1722 for the amount of the application unit 304 or multiple application units 304 for each of the formatted units 306. In this example, each of the formatted units 306 are of the chunk size 1704 and the data size 1722 is per chunk.

As a specific example, the data size 1722 can calculated with Equation 1 below.

$$\text{data size 1722} = (\text{floor}(\text{chunk size 1704/logical boundary 1206})) \times \text{logical boundary 1206} \quad \text{(Equation 1)}$$

In other words, the data size is calculated with the floor function of the chunk size 1704 divided by the logical boundary 1206. The result of the floor function is then multiplied by the logical boundary 1206 to generate the data size 1722.

The flow chart can continue to a pad sizing 1724. The pad sizing 1724 calculates a pad size 1726 for the data pads 402 for each of the formatted units 306. As an example, the pad size 1726 can be calculated with Equation 2 below.

$$\text{pad size 1726} = \text{chunk size 1704} - \text{data size 1722} \quad \text{(Equation 2)}$$

In the words, the pad size 1726 per chunk or per each of the formatted units 306 can be calculated with the chunk size 1704 subtracted by the data size 1722 per chunk or per each of the formatted units 306.

The flow chart can continue to a chunk number calculation 1728. The chunk number calculation 1728 determines a chunk number 1730 or the number of the formatted units 306 needed for the application data 214. The chunk number 1730 can be used to determine the size or length of the formatted data 216. The data preprocessor 208 can perform the chunk number calculation 1728.

The flow chart can continue to a split function 1732. The split function 1732 partitions the application data 214 to the data size 1722 for each of the formatted units 306. The split function 1732 is part of generating the formatted data 216 where the application units 304 are aligned with the chunk size 1704 or the formatted units 306. The data preprocessor 208 can perform the split function 1732.

The flow chart can continue to a write pad function 1734. The write pad function 1734 performs the in-storage processing of writing the formatted data 216 with the application data 214 partitioned to the data size 1722 and with the data pads 402. The data pads 402 can include additional information, such as parity, metadata, synchronization fields, or identification fields. The request distributor 210 can send the device requests 1202 to the storage devices 218 to perform the write pad function 1734 of the formatted data 216.

Returning to the padding query 1714, when the padding query 1714 determines that padding of the application units 304 is not needed, the flow chart can continue to a redundancy query 1736. When the redundancy query 1736 determines that redundancy of the application data 214 is needed, then this branch of the flow chart represents the redundancy function. As an example, the redundancy function is described in FIG. 6.

The flow chart can continue from the redundancy query 1736 to the application data sizing 1720. As an example, FIG. 17 depicts the application data sizing 1720 under the redundancy query 1736 to be a separate function from the application data sizing 1720 under the padding query 1714, although it is understood that the two functions can perform the same operations and can also be the same function. The application data sizing 1720 under the redundancy query 1736 can be computed using the expression found in Equation 1 described earlier.

The flow chart can continue to a chunk function 1718. The chunk function 1718 splits or partitions the application data 214 to the formatted data 216 as described in FIG. 6. The data preprocessor 208 can perform the chunk function 1718. As an example, FIG. 17 depicts the chunk function 1718 under the normal RAID query 1716 to be a separate function from the chunk function 1718 under the redundancy query 1736, although it is understood that the two functions can perform the same operations and can also be the same function.

The flow chart can continue to a redundancy function 1738. For each chunk or for each of the formatted units 306, the redundancy function 1738 copies that application data 214 that is in the range of the data size 1722 and the chunk size 1704 to additional chunks to generate the replica data 602 of FIG. 6.

The flow chart can continue to a write redundancy function 1740. The write redundancy function writes formatted data 216 including the application data 214 and the replica data 602. The request distributor 210 as issue device requests 1202 to the storage devices 218 to perform the write redundancy function 1740. Returning to the branch with the redundancy query 1736, when the redundancy query 1736 determines that redundancy is not needed, the flow chart can continue to the normal RAID query 1716.

For illustrative purposes, the flow chart is described with the split+padding function separately from the redundancy function, although it is understood that the flow chart can provide a different operation. For example, the flow chart can be arranged to provide the split+redundancy function as described in FIG. 5. As an example, this can be accomplished with the redundancy query 1736 being placed before the write pad function 1734. Furthering this example, the redundancy function 1738 above could be modified to operate only on the non-aligned application units 304 to form the aligned data 504 of FIG. 5 as opposed to the replica data 602. The modified redundancy function can be followed by a further write function. The further write function would combine portions of the write pad function 1734 and the write redundancy function 1740. The write pad function 1734 be utilize a portion of the formatted data 216 with the data pads 402 and the write redundancy function 1740 can write the aligned data 504 as opposed to the replica data 602.

Figure 18:
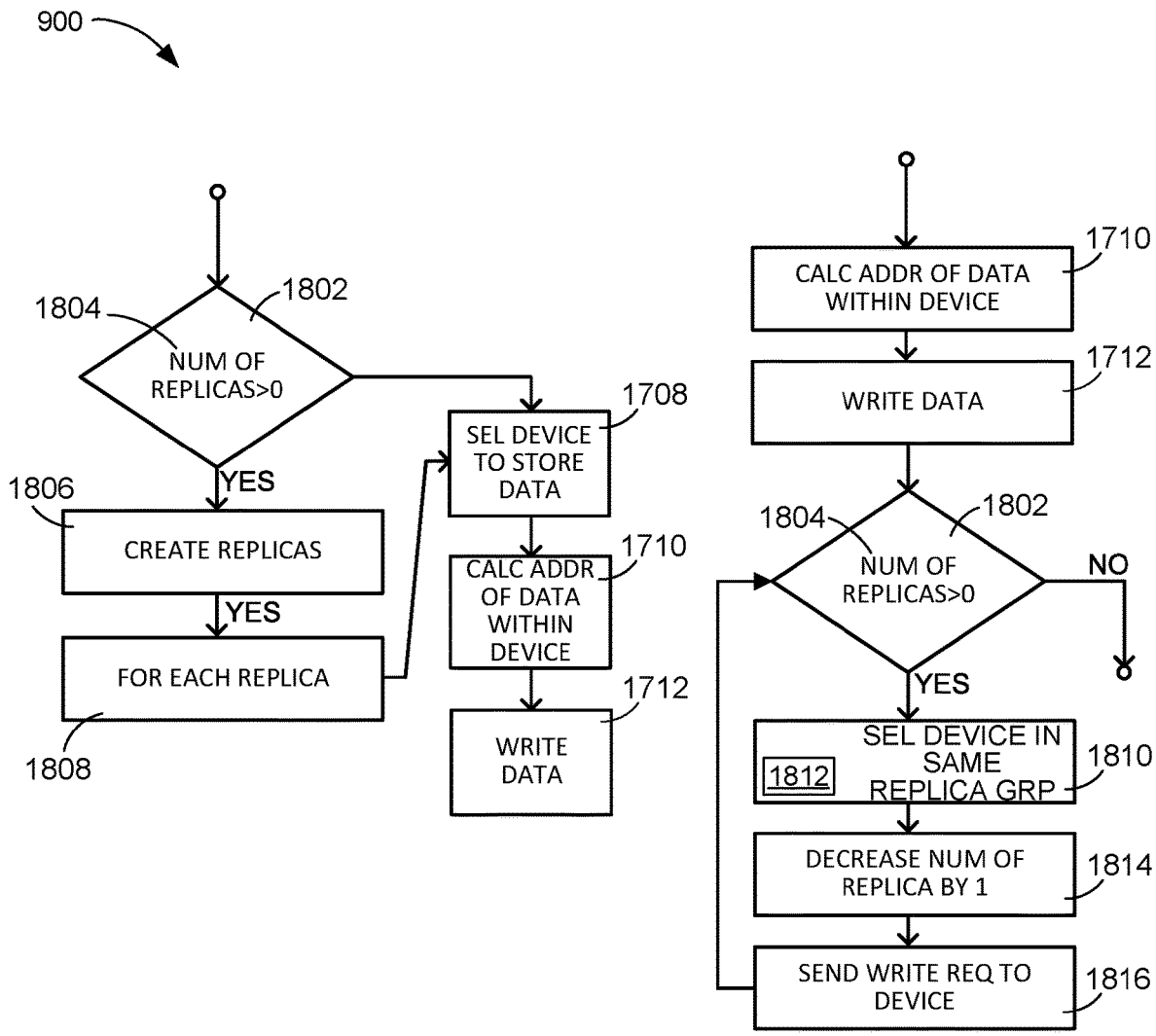
FIG. 18 is an example of a flow chart for a mirroring function for centralized and decentralized embodiments.

Referring now to FIG. 18, therein is shown an example of a flow chart for a mirroring function for centralized and decentralized embodiments. As examples, the centralized embodiment can be the computing system 900 of FIG. 9 or the computing system 1000 of FIG. 10. As an example, the decentralized embodiment can be the computing system 1100 of FIG. 11.

The flow chart on the left-hand side of FIG. 18 represents an example of a flow chart for a centralized embodiment. The flow chart on the right-hand side of FIG. 18 represents an example of a flow chart for a decentralized embodiment.

Starting with the centralized embodiment, the request distributor 210 of FIG. 2 can receive the application request 220 of FIG. 2. The application request 220 can include the data address 1204 of FIG. 12, the application data 214 of FIG. 2, and the transfer length 302 of FIG. 3.

For example, the data preprocessor 208 of FIG. 2 can execute a replica query 1802. The replica query 1802 determines if the replica data 602 of FIG. 6 should be created or not. As an example, the replica query 1802 can make this determines by comparing if a number 1804 of replica data 602 being requested is greater than zero. If so, the flow chart can continue to a create replica 1806. If not, the flow chart can continue to the device selection 1708.

As an example, the device selection 1708 can be the same function or perform the same or similar function as described in FIG. 17. The flow chart can continue to the address calculation 1710. As with the device selection 1708, the address calculation 1710 can be the same function or perform the same or similar function as described in FIG. 17. The flow chart can continue to the write non-chunk function 1712. As with the address calculation 1710, the write non-chunk function 1712 can be the same function or perform the same or similar function as described in FIG. 17.

As an example, the request distributor 210 can execute the device selection 1708, the address calculation 1710, or a combination thereof include the outputs of these operations as part of the device request 1202 of FIG. 12. The write non-chunk function 1712 can be performed by one of the storage devices 218 to store the application data 214.

Returning to the replica query 1802, when the replica query 1802 determines the replica data 602 of FIG. 6 should be generated, then the flow chart can continue to the create replica 1806. As an example, the replica query 1802 can make this determination when the number 1804 of replica sought is greater than zero.

In this example, the create replica 1806 can generate the replica data 602 from the application data 214. The replica data 602 can be as described in FIG. 6. As an example, the data preprocessor 208 can perform the create replica 1806. The create replica 1806 can generate the number 1804 of the replica data 602 as needed and not just one.

The flow chart can continue to a prepare replica 1808. As an example, the request distributor 210 can prepare each of the replica data 602 for the device selection 1708. The replica data 602 can be written to the storage devices 218 following the flow chart from the device selection 1708, as already described.

Returning to the flow chart for the decentralized embodiment on the right-hand side of FIG. 18, the request distributor 210 can receive the application request 220. The application request 220 can include the data address 1204, the application data 214, the transfer length 302, and the number 1804 of the replica data 602.

The request distributor 210 can send one of the device requests 1202 to one of the storage devices 218. That storage device 218 can perform the address calculation 1710. As an example, the address calculation 1710 can be the same function or perform the same or similar function as described in FIG. 17 and as for the centralized embodiment.

In this example, the same storage device 218 can also perform the write non-chunk function 1712. As an example, the write non-chunk function 1712 can be the same function or perform the same or similar function as described in FIG. 17 and as for the centralized embodiment.

The flow chart can continue to the replica query 1802. As an example, the replica query can be the same function or perform the same or similar function as described for the centralized embodiment. If the number 1804 for the replica data 602 is not greater than zero, the process to write additional data stops for this particular application request 220.

If the replica query 1802 determines that the number 1804 for the replica data 602 is greater than zero, then the flow chart can continue a group selection 1810. The group selection 1810 can select one of the storage devices 218 in the same replica group 1812. The replica group 1812 is a portion of the storage devices 218 of FIG. 2 in the storage group 206 of FIG. 2 designated to be part of a redundancy function for the application data 214 and for in-storage processing. The request distributor 210 can perform the replica query 1802, the group selection 1810, or a combination thereof.

The flow chart can continue to a number update 1814. The number update 1814 can decrement the number 1804 for replica data 602 still to be written to the replica group 1812. The decrement amount can be by an integer value, such as one. The request distributor 210 can perform the number update 1814.

The flow chart can continue to a request generation 1816. The request generation 1816 generates one of the device requests 1202 to another of the storage devices 218 in the replica group 1812 for writing the replica data 602. The request distributor 210 can perform the request generation 1816.

The flow chart can loop back (not drawn in FIG. 18) to the replica query 1802 and iterate until the number 1804 has reached zero. At this point, the replica data 602 has been written to the replica group 1812.

For illustrative purposes, the decentralized embodiment is described as operating in a serial manner writing to one of the storage devices 218 at a time, although it is understood that the decentralized embodiment can operate differently. For example, the request distributor 210 can issue a number of device requests 1202 to the storage devices 218 in the replica group 1812 and have the replica data 602 written on multiple storage devices 218 simultaneously before the other storage devices 218 in the replica group completes the write.

It has been discovered that the computing system provides efficient distributed processing by providing methods and apparatuses for performing in-storage processing with multiple storage devices, with capabilities for performing in-storage processing of application data. An execution of an application can be shared by distributing the execution among various devices in a storage device. Each of the devices can perform in-storage processing with the application data as requested by an application request.

It has also been discovered that the computing system can reduce overall system power consumption by reducing the number of inputs/outputs between the application execution and the storage device. This reduction is achieved by having the devices perform the in-storage processing instead of mere storage, read, and re-store by the application. Instead, the in-storage processing outputs can be returned as an aggregated output from the various devices that performed the in-storage processing back to the application. The application can continue to execute and utilize the in-storage outputs, the aggregated output, or a combination thereof.

It has been discovered that the computing system provides for reduced total cost of ownership by providing formatting and translation function of the application data for different configuration or organization of the storage device. Further, the computing system also provides translation for the type of in-storage processing to be carried out by the devices in the storage device. Examples of types of translation or formatting include split, split+padding, split+redundancy, and mirroring.

It has been discovered that the computing system provides more efficient execution of the application with less interrupts to the application via the output coordination of the in-storage processing outputs from the storage devices. The output coordination can buffer the in-storage processing outputs and can also sort the order of each of the in-storage processing outputs before returning an aggregated output to the application. The application can continue to execute and utilize the in-storage outputs, the aggregated output, or a combination thereof.

It has been discovered that the computing system further minimizes integration obstacles by allowing the devices in the storage group to have different or the same functionalities. As an example, one of the devices can function as the only output coordinator for all the in-storage processing outputs from the other devices. As a further example, the aggregation function can be distributed amongst the devices passing along and performing partial aggregation from device to device until one of the devices returns the full aggregated output back to the application. The application can continue to execute and utilize the in-storage outputs, the aggregated output, or a combination thereof.

The modules described in this application can be hardware implementations or hardware accelerators in the computing system 100. The modules can also be hardware implementation or hardware accelerators within the computing system 100 or external to the computing system 100.

The modules described in this application can be implemented as instructions stored on a non-transitory computer readable medium to be executed by the computing system 100. The non-transitory computer medium can include memory internal to or external to the computing system 100. The non-transitory computer readable medium can include non-volatile memory, such as a hard disk drive, non-volatile random access memory (NVRAM), solid-state storage group (SSD), compact disk (CD), digital video disk (DVD), or universal serial bus (USB) flash memory devices. The non-transitory computer readable medium can be integrated as a part of the computing system 100 or installed as a removable portion of the computing system 100.

Figure 19:
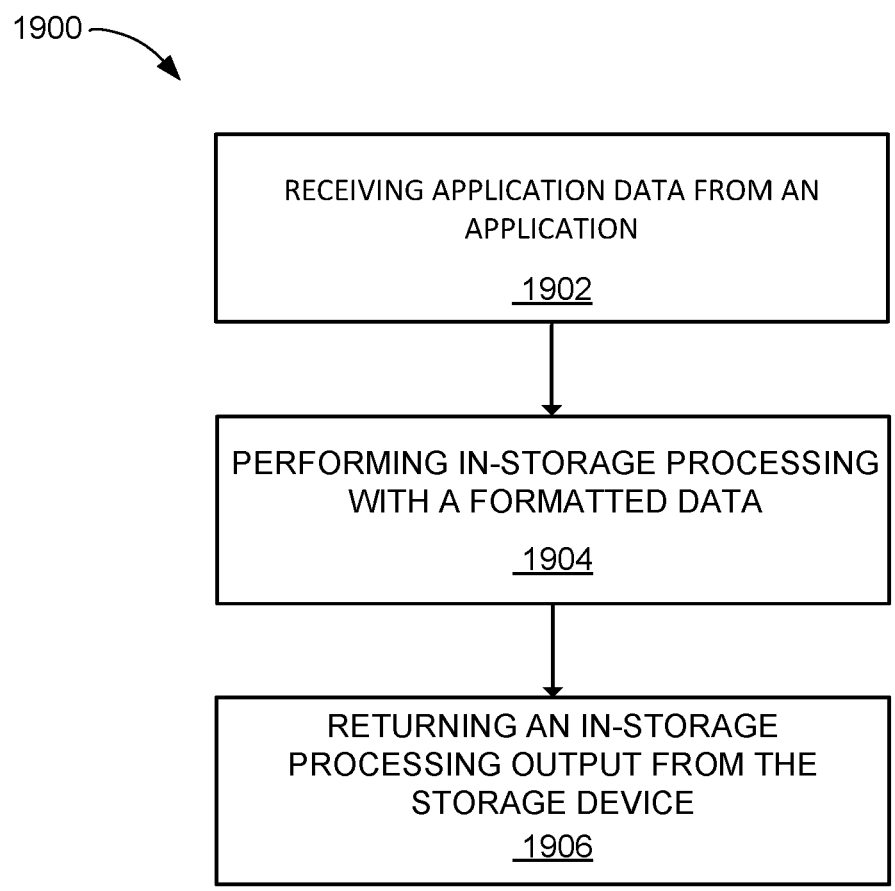
FIG. 19 is a flow chart of a method of operation of a computing system in an embodiment of the present invention.

Referring now to FIG. 19, therein is shown a flow chart of a method 1900 of operation of a computing system 100 in an embodiment of the present invention. The method 1900 includes: receiving and managing application data from an application, executed by a host computer, by an in-storage processing engine in a block 1902; performing in-storage processing with formatted data, based on the application data, including performing integer math operations, floating point math operations, Boolean operations, reorganization of data bits or symbols, and combinations thereof on the application data by an in-storage processing coordinator in a block 1904; and aligning the formatted data from the application data to return an in-storage processing output to the application, by a data preprocessor, for continued execution in a block 1906.

The method 1900 can further include receiving a sub-application request at the storage device based on an application request from the application for performing in-storage processing. The method 1900 can further include sorting in-storage processing outputs from a storage group including the storage device. The method 1900 can further include issuing a device request based on an application request from the application to a storage group including the storage device.

The method 1900 can further include issuing a device request from the storage device; receiving the device request at another storage device; generating another device request by the another storage device; and receiving the another device request by yet another storage device The method 1900 can further include sending in-storage processing outputs by a storage group include the storage device to be aggregated and sent to the application. The method 1900 can further include aggregating an in-storage processing output as a partial aggregated output to be returned to the application. The method 1900 can further include generating the formatted data based on the application data. The method 1900 can further include generating a formatted unit of the formatted data with an application unit of the application data and a data pad. The method 1900 can further include generating a formatted unit of the formatted data with non-aligned instances of application units of the application data and a data pad.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
   a storage device, coupled to a central processing unit, configured to generate an aggregated output from in-storage processing outputs from one or more other storage devices and return the aggregated output to an application including:
      an in-storage processing engine configured to receive and manage application data from the application executed in a host computer,
      an in-storage processing coordinator, in the in-storage processing engine, configured to perform in-storage processing with formatted data, based on the application data, including performing integer math operations, floating point math operations, Boolean operations, reorganization of data bits or symbols, and combinations thereof on the application data, and
      a data preprocessor, in the in-storage processing coordinator, configured to align the formatted data from the application data to return an in-storage processing output to the application for continued execution.

2. The computing system as claimed in claim 1, wherein the storage device is further configured to receive a sub-application request based on splitting of an application request from the application for performing in-storage processing.

3. The computing system as claimed in claim 1, wherein the storage device is further configured to issue a device request, based on an application request from the application, to at least one of the other storage devices.

4. The computing system as claimed in claim 1, wherein:
   the storage device is further configured to:
      issue a device request;
   further comprising:
      another storage device configured to:
         receive the device request,
         generate another device request; and
      yet another storage device configured to receive the another device request.

5. The computing system as claimed in claim 1, further comprising a storage group including the storage device, configured to send in-storage processing outputs to be aggregated and sent to the application.

6. The computing system as claimed in claim 1, wherein the storage device is further configured to aggregate an in-storage processing output as a partial aggregated output to be returned to the application.

7. The computing system as claimed in claim 1, wherein the storage device is further configured to generate the formatted data from the application data.

8. The computing system as claimed in claim 1, wherein the storage device is further configured to generate a formatted unit of the formatted data with an application unit of the application data.

9. The computing system as claimed in claim 1, wherein the storage device is further configured to generate a formatted unit of the formatted data with non-aligned instances of application units of the application data, wherein the non-aligned instances of the application units traverse multiple instances of the formatted unit.

10. A method of operation of a computing system comprising:
    receiving and managing application data from an application, executed by a host computer, by an in-storage processing engine;
    generating an aggregated output from in-storage processing outputs from one or more other storage devices and return the aggregated output to the application;
    performing in-storage processing with formatted data, based on the application data, including performing integer math operations, floating point math operations, Boolean operations, reorganization of data bits or symbols, and combinations thereof on the application data by an in-storage processing coordinator; and
    aligning the formatted data from the application data to return an in-storage processing output to the application, by a data preprocessor, for continued execution.

11. The method as claimed in claim 10, further comprising receiving a sub-application request at the storage device based on splitting of an application request from the application for performing in-storage processing.

12. The method as claimed in claim 10, further comprising sorting in-storage processing outputs from a storage group including the storage device.

13. The method as claimed in claim 10, further comprising issuing a device request based on an application request from the application to a storage group including the storage device.

14. The method as claimed in claim 10, further comprising:
   issuing a device request from the storage device;
   receiving the device request at another storage device;
   generating another device request by the another storage device; and
   receiving the another device request by yet another storage device.

15. The method as claimed in claim 10, further comprising sending in-storage processing outputs by a storage group including the storage device to be aggregated and sent to the application.

16. The method as claimed in claim 10, further comprising aggregating an in-storage processing output as a partial aggregated output to be returned to the application.

17. The method as claimed in claim 10, further comprising generating the formatted data based on the application data.

18. The method as claimed in claim 10, further comprising generating a formatted unit of the formatted data with an application unit of the application data.

19. The method as claimed in claim 10, further comprising generating a formatted unit of the formatted data with non-aligned instances of application units of the application data, wherein the non-aligned instances of the application units traverse multiple instances of the formatted unit.

* * * * *